(12) United States Patent
Turpin et al.

(10) Patent No.: US 7,130,292 B2
(45) Date of Patent: Oct. 31, 2006

(54) OPTICAL PROCESSOR ENHANCED RECEIVER ARCHITECTURE (OPERA)

(75) Inventors: Terry M. Turpin, Ellicott City, MD (US); James L. Lafuse, Columbia, MD (US)

(73) Assignee: Essex Corporation, Columbia, MD (US)

( * ) Notice: Subject to any disclaimer, the term of this patent is extended or adjusted under 35 U.S.C. 154(b) by 618 days.

(21) Appl. No.: 09/766,151

(22) Filed: Jan. 19, 2001

(65) Prior Publication Data

US 2002/0126644 A1    Sep. 12, 2002

(51) Int. Cl.
*H04B 7/216*    (2006.01)

(52) U.S. Cl. .................. 370/342; 359/306; 359/359; 359/561; 375/100; 704/216; 704/218; 704/237

(58) Field of Classification Search ................ 370/342, 370/201, 335, 329; 708/816; 375/130, 143, 375/144, 150, 152; 342/25; 398/74, 115; 359/107, 306, 560, 561, 22, 572
See application file for complete search history.

(56) References Cited

U.S. PATENT DOCUMENTS

| | | | |
|---|---|---|---|
| 3,937,942 A | | 2/1976 | Bromley et al. |
| 4,198,634 A | | 4/1980 | Jernigan et al. |
| 4,225,938 A | * | 9/1980 | Turpin ................. 708/816 |
| 4,267,580 A | | 5/1981 | Bond et al. |
| 4,370,726 A | | 1/1983 | Caracappa |
| 4,421,388 A | | 12/1983 | Berg et al. |
| 4,426,134 A | | 1/1984 | Abramovitz et al. |
| 4,468,093 A | | 8/1984 | Brown |
| 4,620,293 A | | 10/1986 | Schlunt et al. |

(Continued)

FOREIGN PATENT DOCUMENTS

WO    WO 98/08319    2/1998

OTHER PUBLICATIONS

Nishimori, "CCD Matched Filter in Spread Spectrum Communication", IEEE Symposium, Sep. 1998.

(Continued)

*Primary Examiner*—Doris H. To
*Assistant Examiner*—Robert W. Wilson
(74) *Attorney, Agent, or Firm*—Morrison & Foerster LLP

(57) ABSTRACT

A method and apparatus for enhancing the receiving and information identification functions of multiple access communications systems by employing one or more optical processors configured as a bank of 1-D correlators. The present invention is particularly useful in a DS/SS CDMA communications system, resulting in a multiuser CDMA system that approaches carrier to noise performance (C/N) as opposed to being limited by multiple access interference (MAI). The correlators are arranged in parallel to detect and/or demodulate the received signal, in conjunction with one or more complex algorithms to perform near-optimum multiuser detection, perform multipath combining and/or perform carrier Doppler compensation. An improved receiver in accordance with the present invention comprises means for receiving a plurality of signals transmitted through a communications channel; signal conversion means for converting the received signals into a form suitable for input to the multichannel correlator; a multichannel optical correlator for identifying the presence of particular waveforms and estimating the relative time delay or delays, carrier frequency offset from expected, RF amplitude and RF phase for each received spread spectrum waveform present in the received plurality of signals; a controller for determining and providing to the optical correlator the appropriate set of reference hypotheses; and one or more receiver algorithms depending on the exact receiver function to be performed.

13 Claims, 19 Drawing Sheets

General Multiplying Integrated Hypothesis and TDI Detector

U.S. PATENT DOCUMENTS

| | | | |
|---|---|---|---|
| 4,695,973 A | 9/1987 | Yu | |
| 4,755,745 A | 7/1988 | Cohen | |
| 4,802,149 A | 1/1989 | Moore | |
| 4,813,006 A | 3/1989 | Burns et al. | |
| 4,833,637 A | 5/1989 | Casasent et al. | |
| 4,843,587 A | 6/1989 | Schlunt et al. | |
| 4,906,069 A | 3/1990 | Brandstetter et al. | |
| 4,979,186 A | 12/1990 | Fullerton | |
| 5,005,946 A | 4/1991 | Brandstetter | |
| 5,079,555 A * | 1/1992 | Turpin | 342/25 |
| 5,126,682 A | 6/1992 | Weinberg et al. | |
| 5,218,619 A | 6/1993 | Dent | |
| 5,276,705 A | 1/1994 | Higgins | |
| 5,305,349 A | 4/1994 | Dent | |
| 5,311,360 A * | 5/1994 | Bloom et al. | 359/572 |
| 5,343,496 A * | 8/1994 | Honig et al. | 370/342 |
| 5,381,362 A | 1/1995 | Shen et al. | |
| 5,384,573 A | 1/1995 | Turpin | |
| 5,438,440 A | 8/1995 | Paek et al. | |
| 5,610,907 A | 3/1997 | Barrett | |
| 5,619,537 A | 4/1997 | Altes | |
| 5,684,793 A | 11/1997 | Kiema et al. | |
| 5,719,852 A * | 2/1998 | Schilling et al. | 370/201 |
| 5,724,162 A * | 3/1998 | Garcia et al. | 359/22 |
| 5,736,958 A | 4/1998 | Turpin | |
| 5,774,494 A | 6/1998 | Sawahashi et al. | |
| 5,903,550 A * | 5/1999 | Spock | 370/335 |
| 6,011,812 A | 1/2000 | Laakso et al. | |
| 6,141,374 A | 10/2000 | Burns | |
| 6,181,729 B1 * | 1/2001 | O'Farrell | 375/130 |
| 6,222,833 B1 * | 4/2001 | Seo | 370/342 |

OTHER PUBLICATIONS

N. Riza et al., "Signaling system for multiple-access laser communications and interference protection", Applied Optics, vol. 32, No. 11, pp. 1965-1972, Apr. 10, 1993.

A. Hassan et al., "Spatial optical CDMA", IEEE Journal on Selected Areas in Communications; vol. 13, No. 3; p. 609-613; Apr. 1, 1995.

* cited by examiner

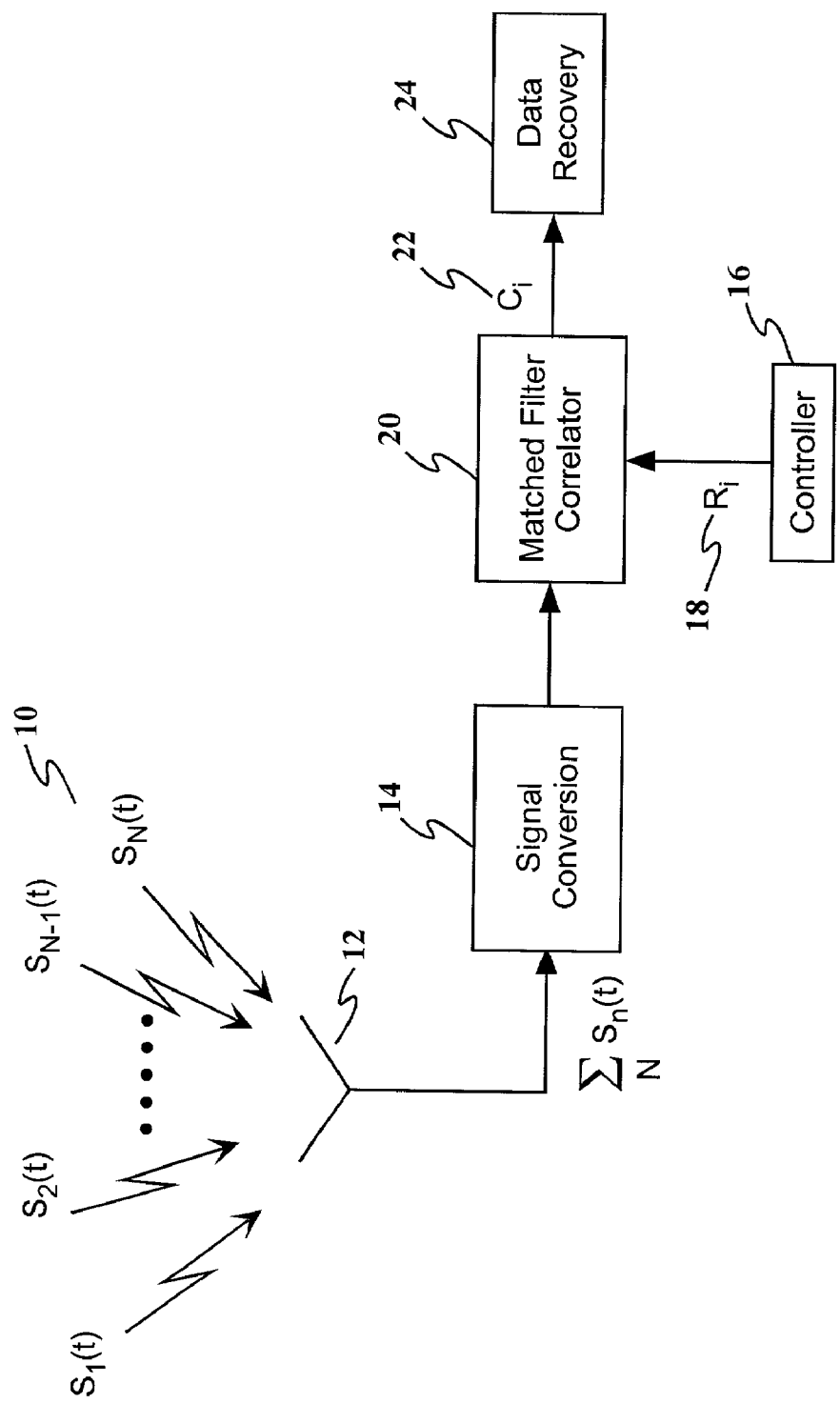
FIG. 1: Single User Matched Filter Correlator (Prior Art)

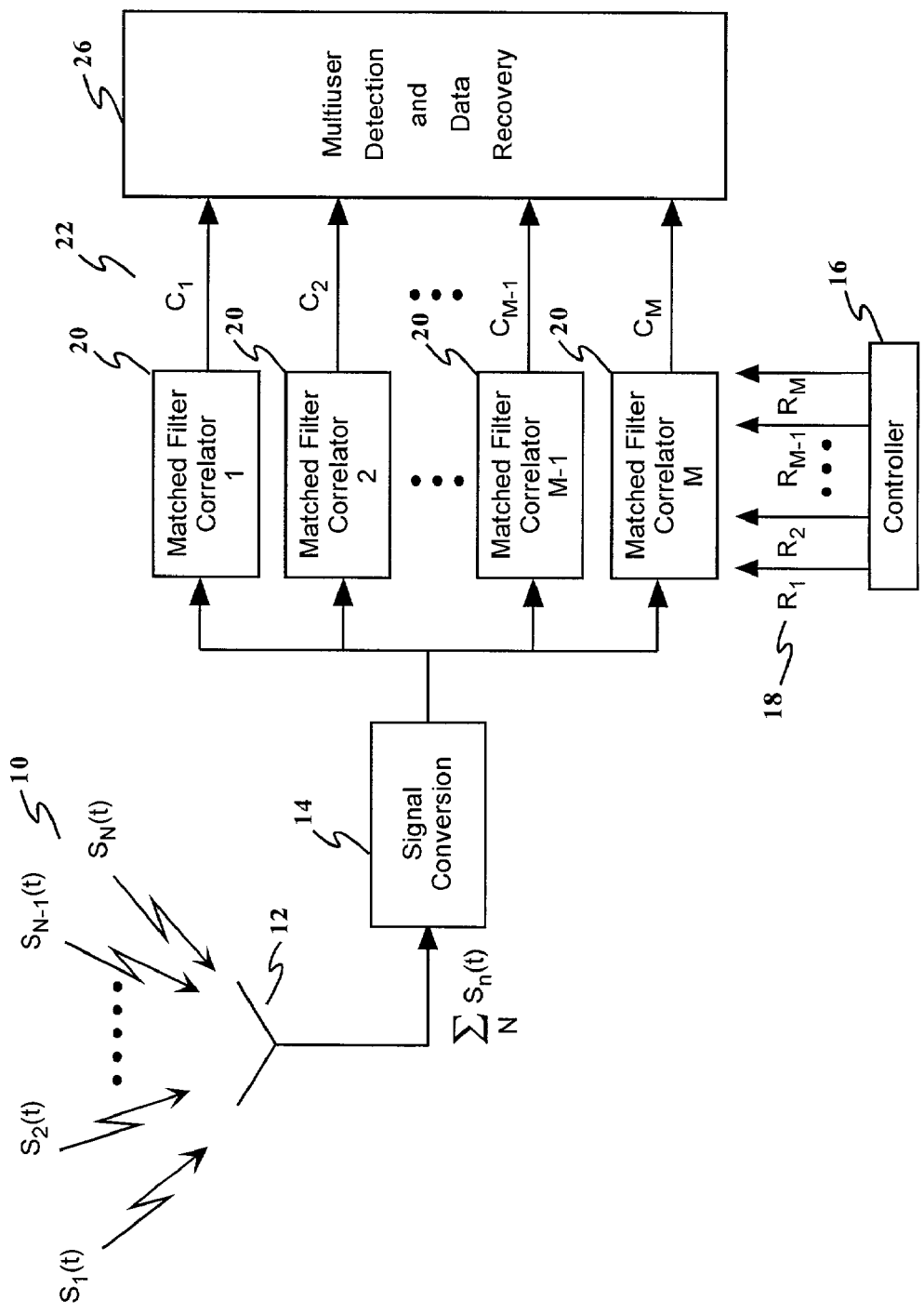
FIG. 2: Multiuser Matched Filter Correlators (Prior Art)

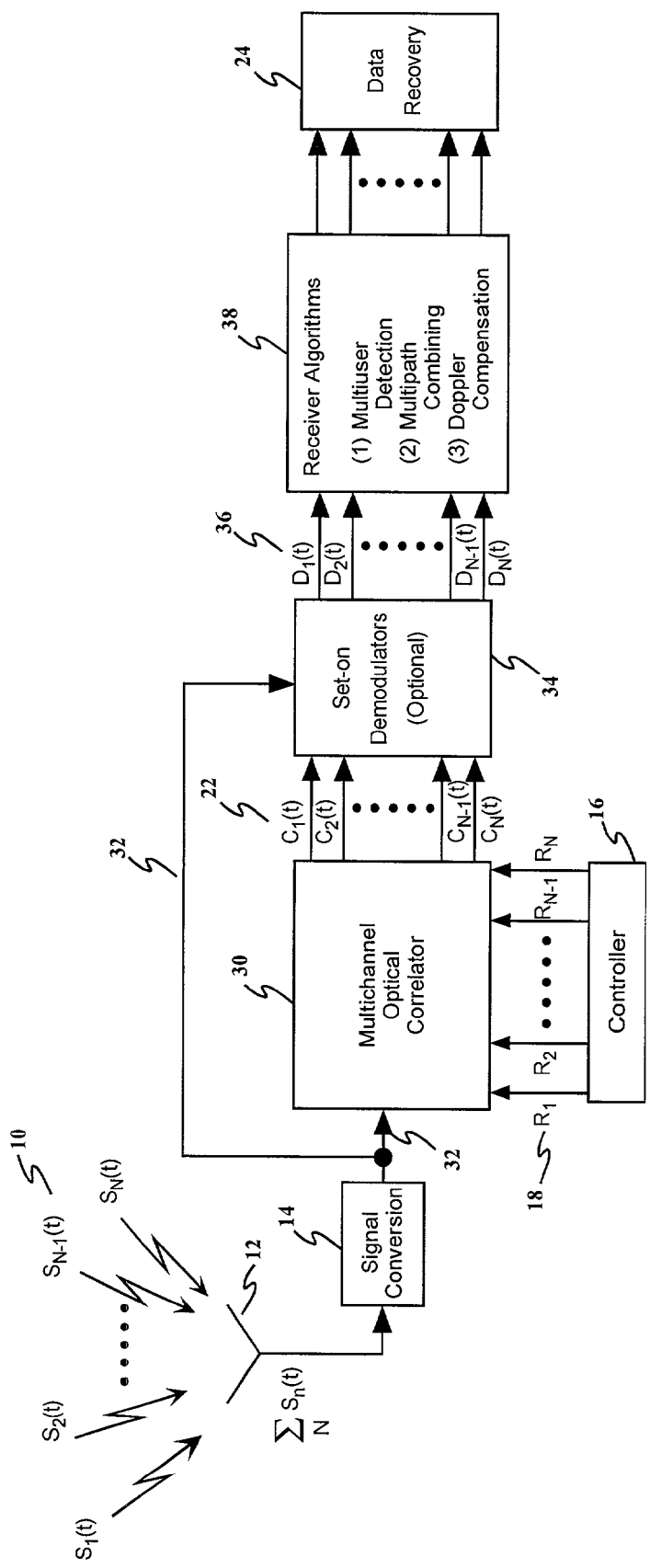
FIG. 3: OPERA Block Diagram

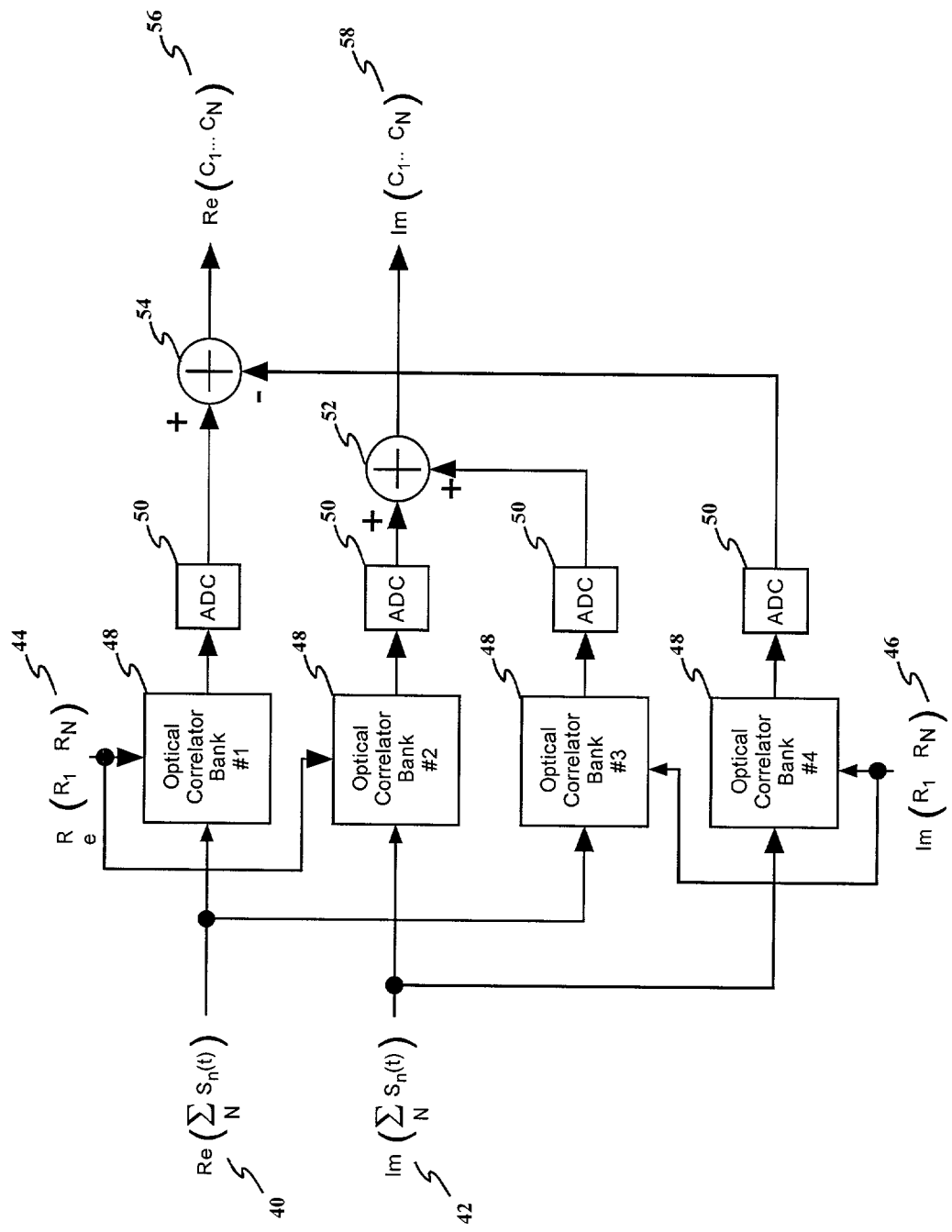
FIG. 4: Complex Baseband Correlator

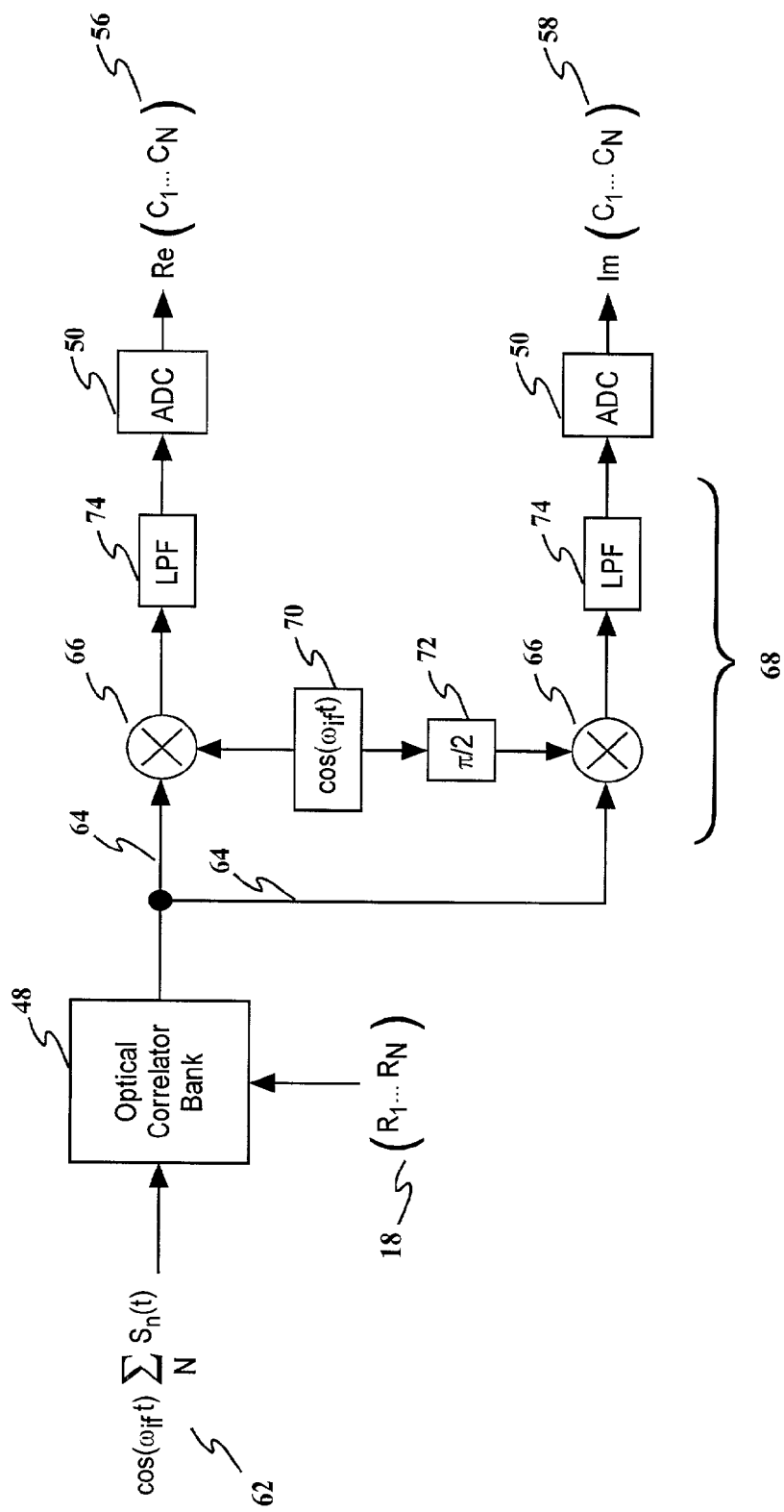
FIG. 5: Complex Intermediate Frequency Correlator

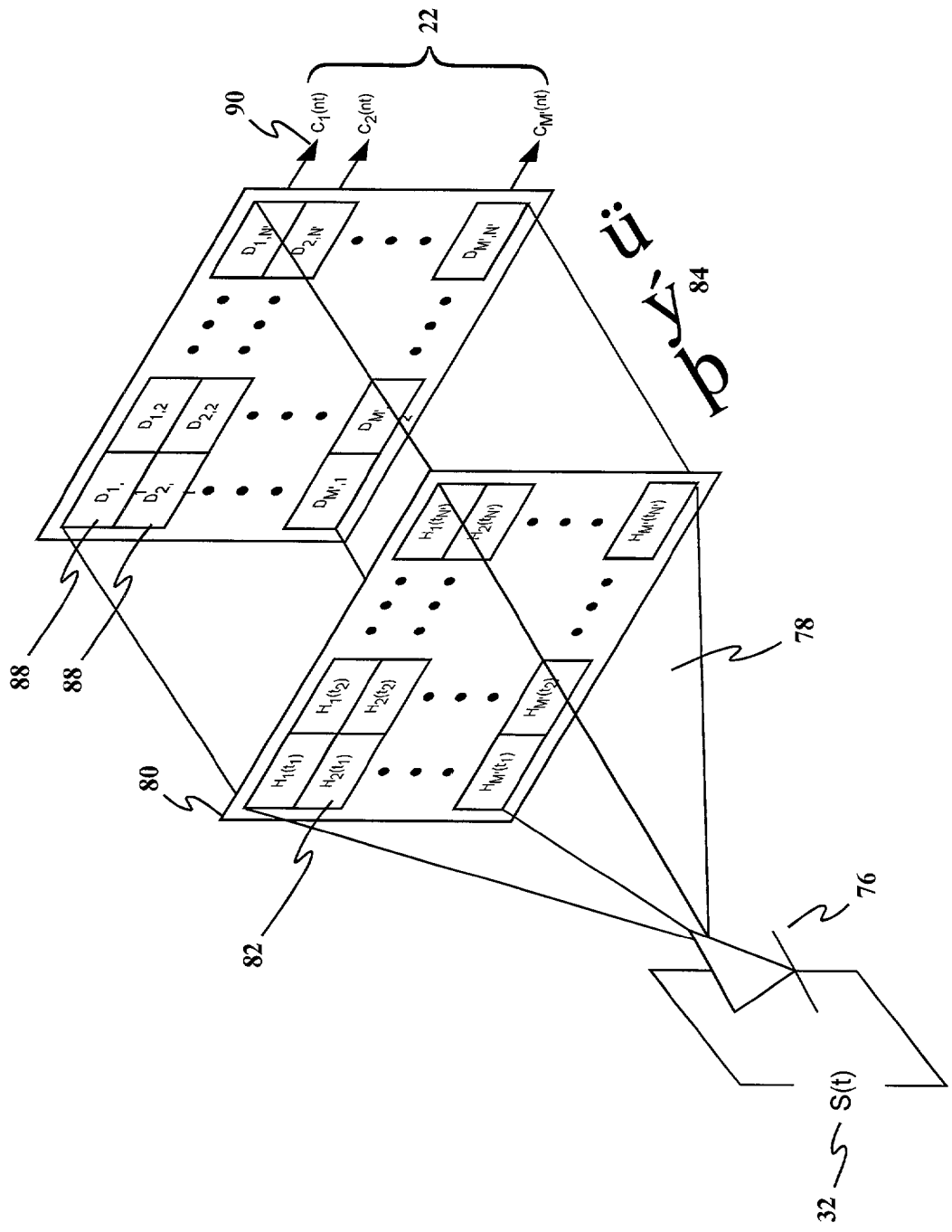
FIG. 6: DDID Architecture

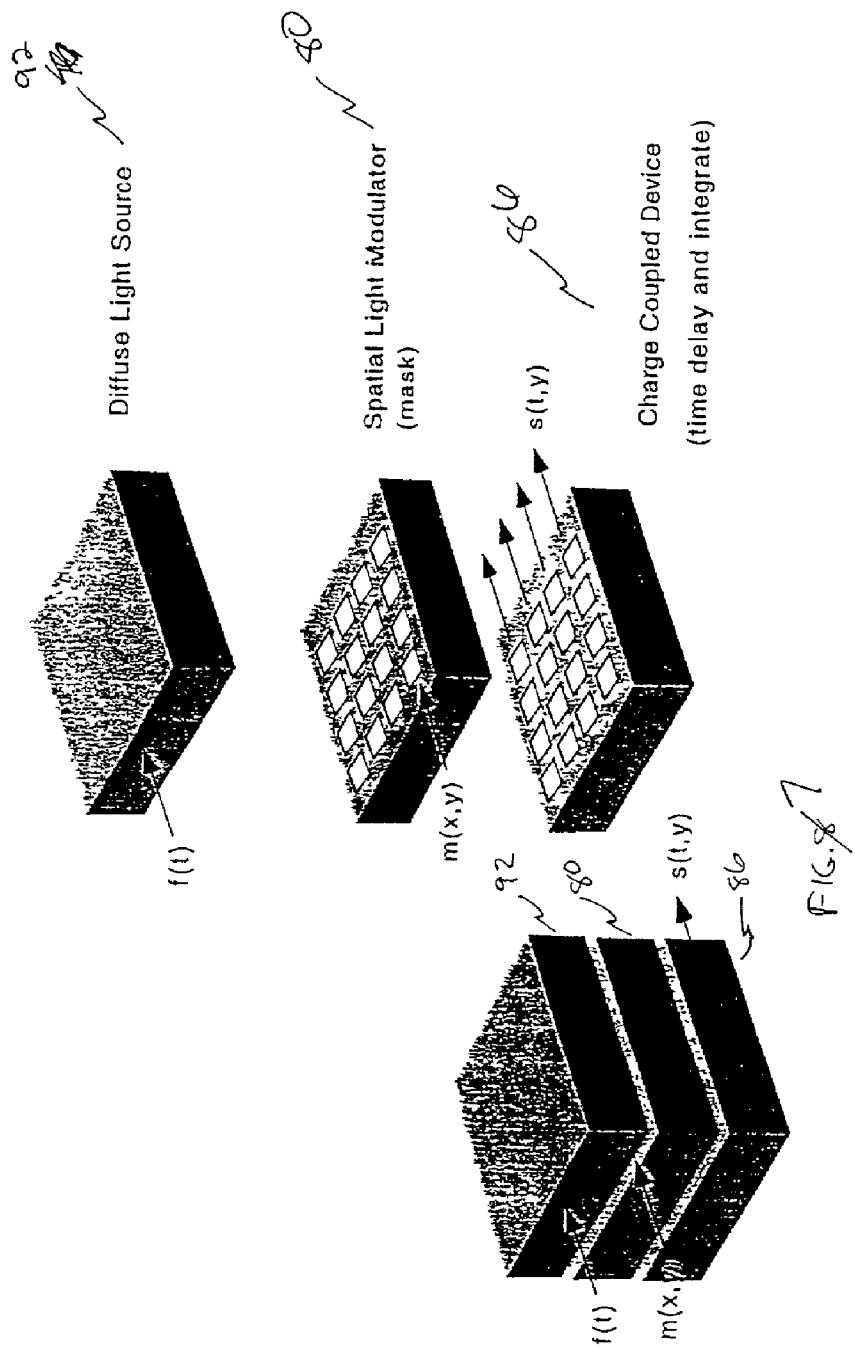
FIG. 7: DDID Module Stack

| Time t | Operation | CCD site | | | | CCD output y |
|---|---|---|---|---|---|---|
| | | (1, y) | (2, y) | (3, y) | (4, y) | |
| 0 | Start | 0 | 0 | 0 | 0 | 0 |
| 1 | s(1) | s(1) m(1,y) | s(1) m(2,y) | s(1) m(3,y) | s(1) m(4,y) | 0 |
| 2 | Shift + s(2) | s(2) m(1,y) | s(1) m(1,y) + s(2) m(2, y) | s(1) m(2,y) + s(2) m(3,y) | s(1) m(3,y) + s(2) m (4, y) | s(1)m(4,y) |
| 3 | Shift + s(3) | s(3) m(1,y) | s(2) m(1, y) + s(3) m (2, y) | s(1) m(1,y) + s(2) m(2,y) + s(3) m (3, y) | s(1) m(2,y) + s(2) m(3,y) + s(3) m (4, y) | s(1) m(3,y) + s(2) m(4,y) |
| 4 | Shift + s(4) | s(4) m(1,y) | s(3) m(1,y) + s(4) m(2, y) | s(2) m(1, y) + s(3) m (2, y) + s(4) m(3, y) | s(1)m(1,y) + s(2) m(2, y) + s(3) m(3,y) + s(4) m(4, y) | s(1) m(2,y) + s(2) m(3, y) + s(3) m(4,y) |
| 5 | Shift + s(5) | s(5) m(1,y) | s(4) m(1,y) + s(5) m(2,y) | s(3)m(1,y) + s(4)m (2,y) + s(5)m(3,y) | s(2) m(1,y) + s(3) m(2,y) + s(4) m(3,y) + s(5)m(4,y) | s(1) m(1,y) + s(2) m(2,y) + s(3) m(3,y) + s(4) m(4,y) |
| 6 | Shift + s(6) | s(6) m(1,y) | s(5) m(1,y) + s(6) m(2,y) | s(4) m(1,y) + s(5) m(2,y) + s(6) m(3,y) | s(3) m(1,y) + s(4) m(2,y) + s(5) m(3,y) + s(6) m(4,y) | s(2) m(1,y) + s(3) m(2,y) + s(4) m(3,y) + s(5) m(4,y) |

FIG. 8: DDID Operation (4 Stage TDI)

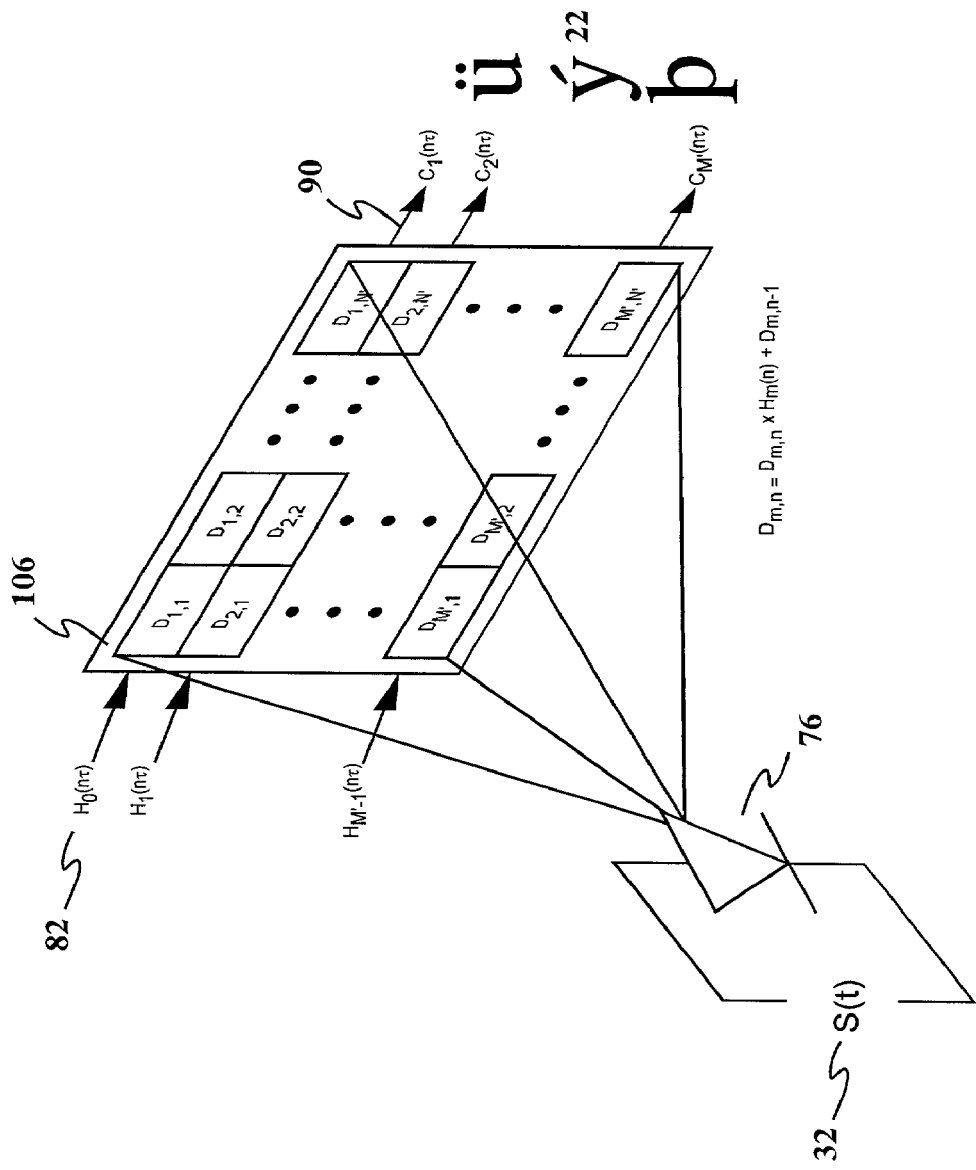
FIG. 9: Integrated Mask and Detector Architecture

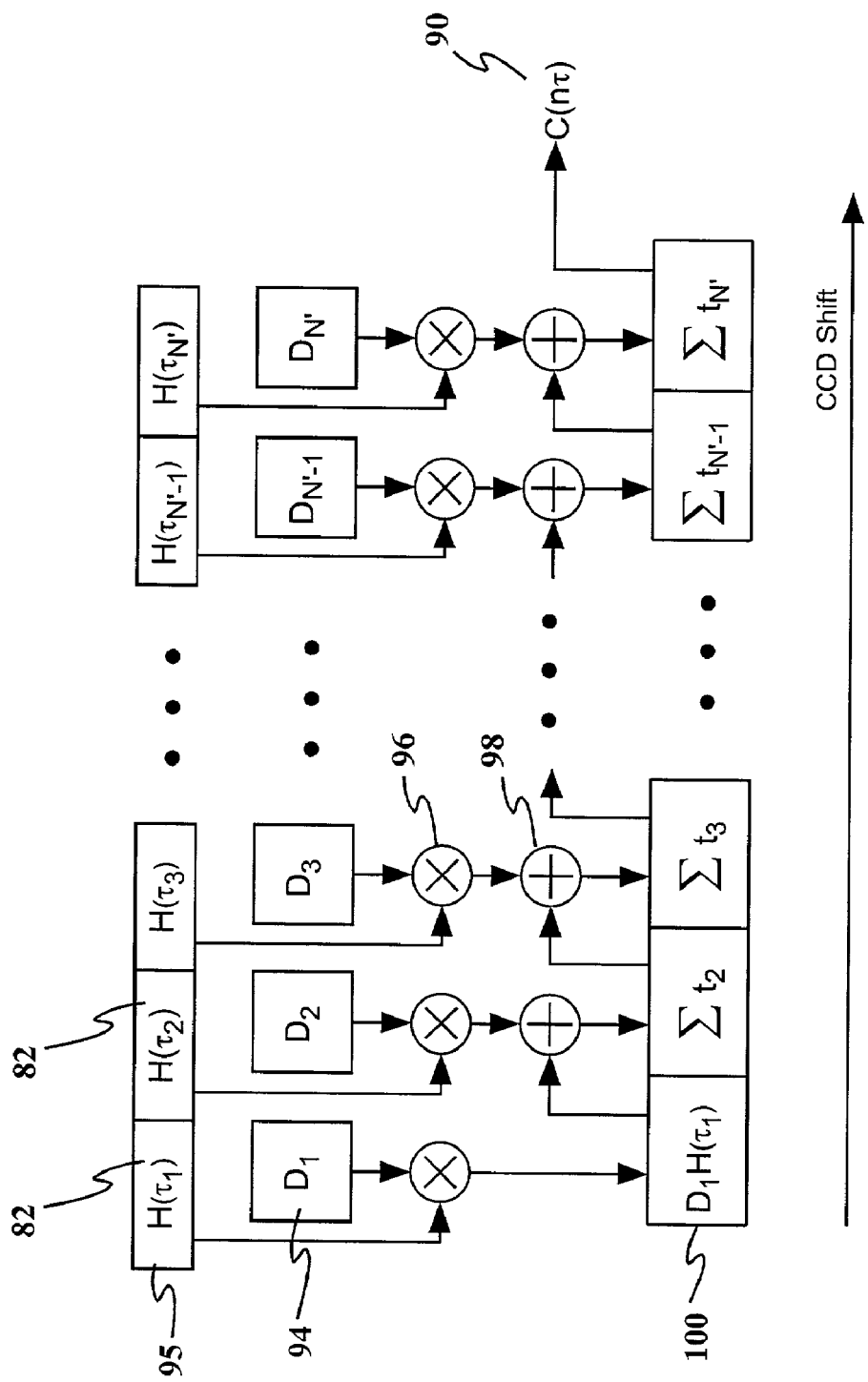
FIG. 10: General Multiplying Integrated Hypothesis and TDI Detector

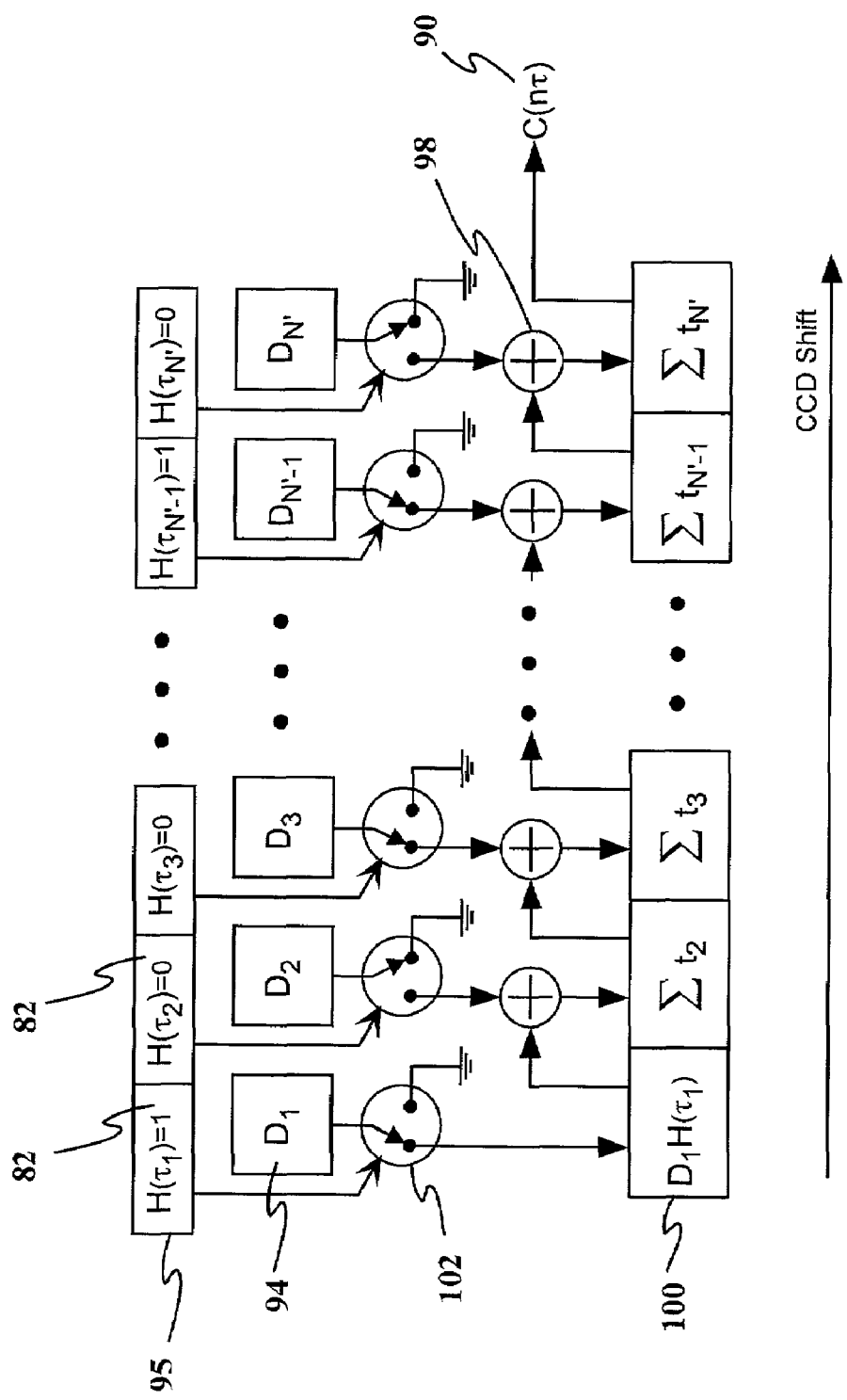
FIG. 11: Binary Integrated Hypothesis and TDI Detector

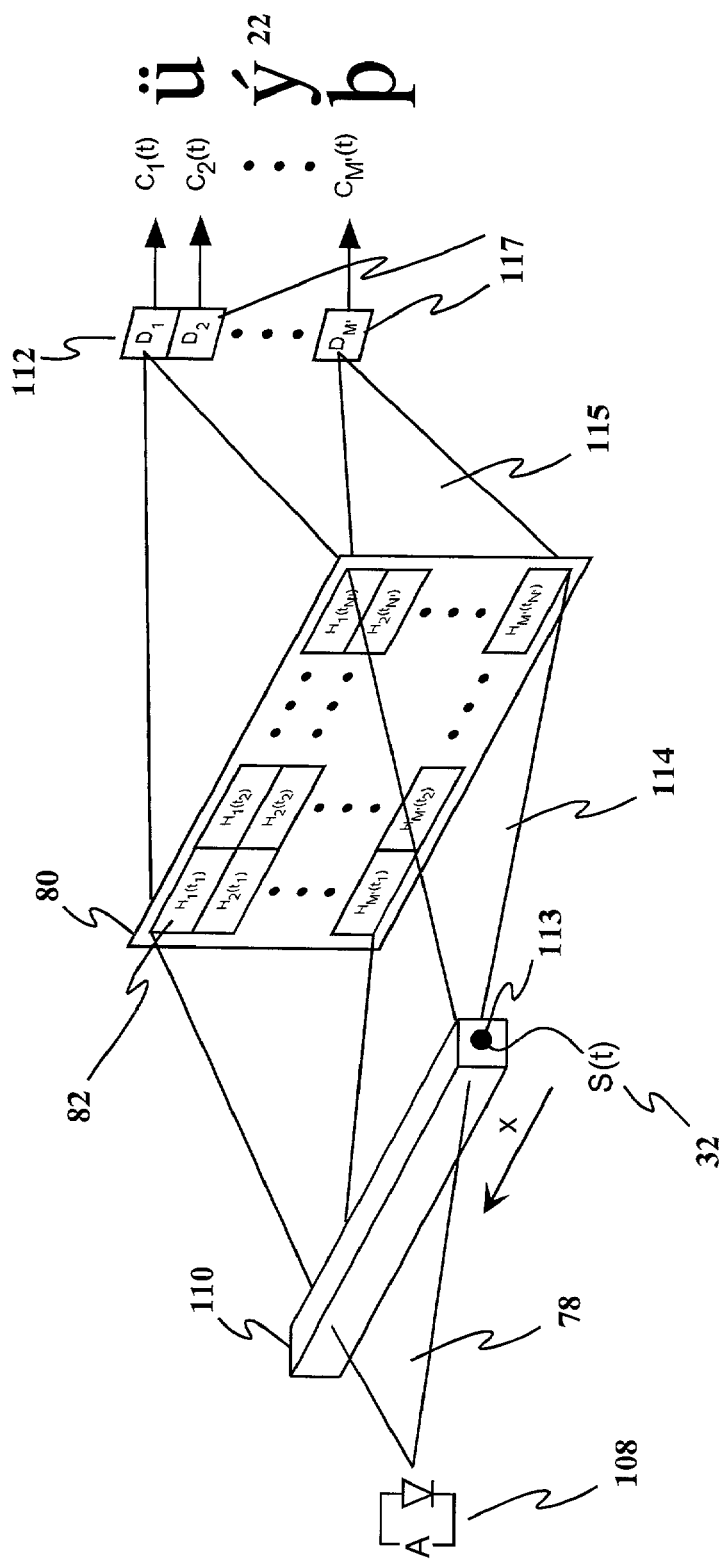
FIG. 12: Space Integration Traveling Wave Displacement Architecture

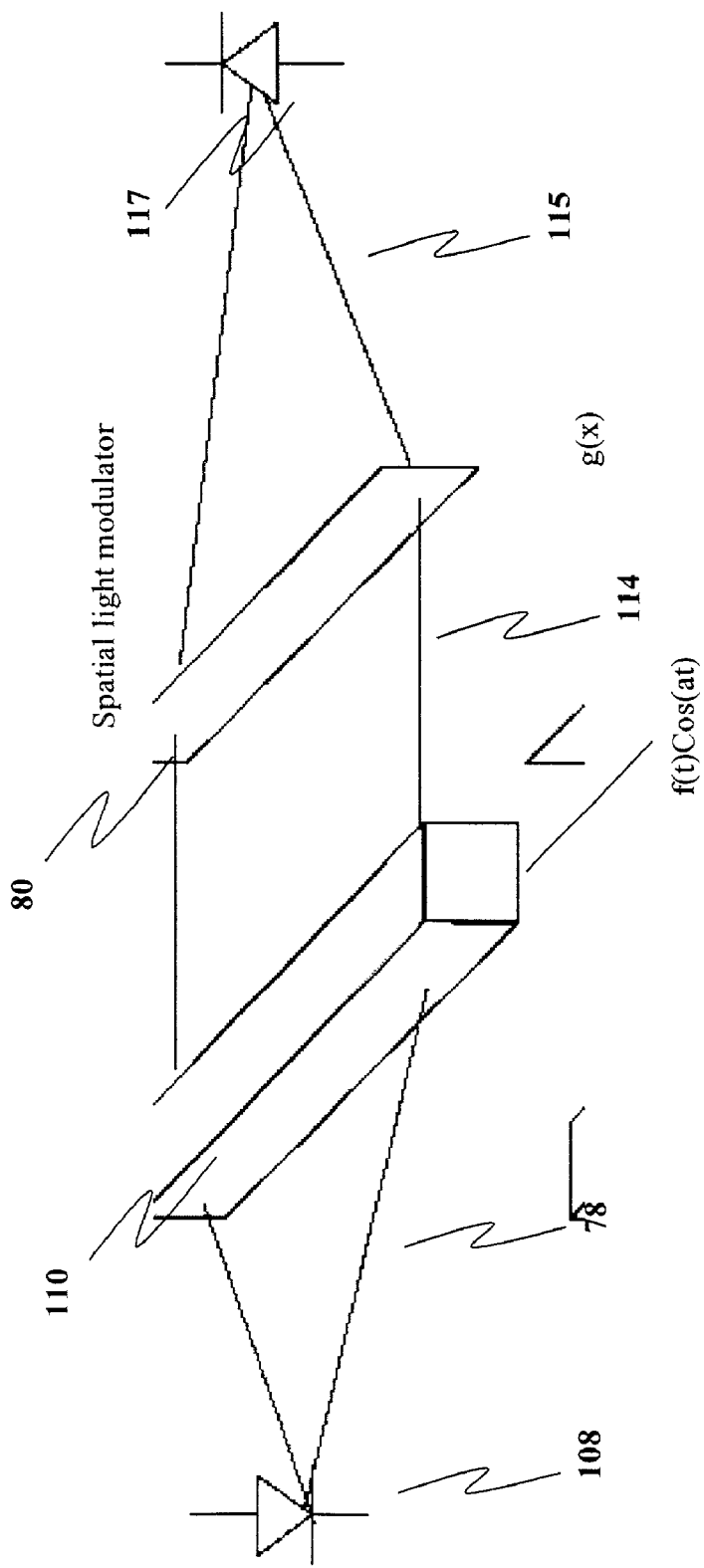
FIG. 13: Single Channel of Space Integration Traveling Wave Displacement

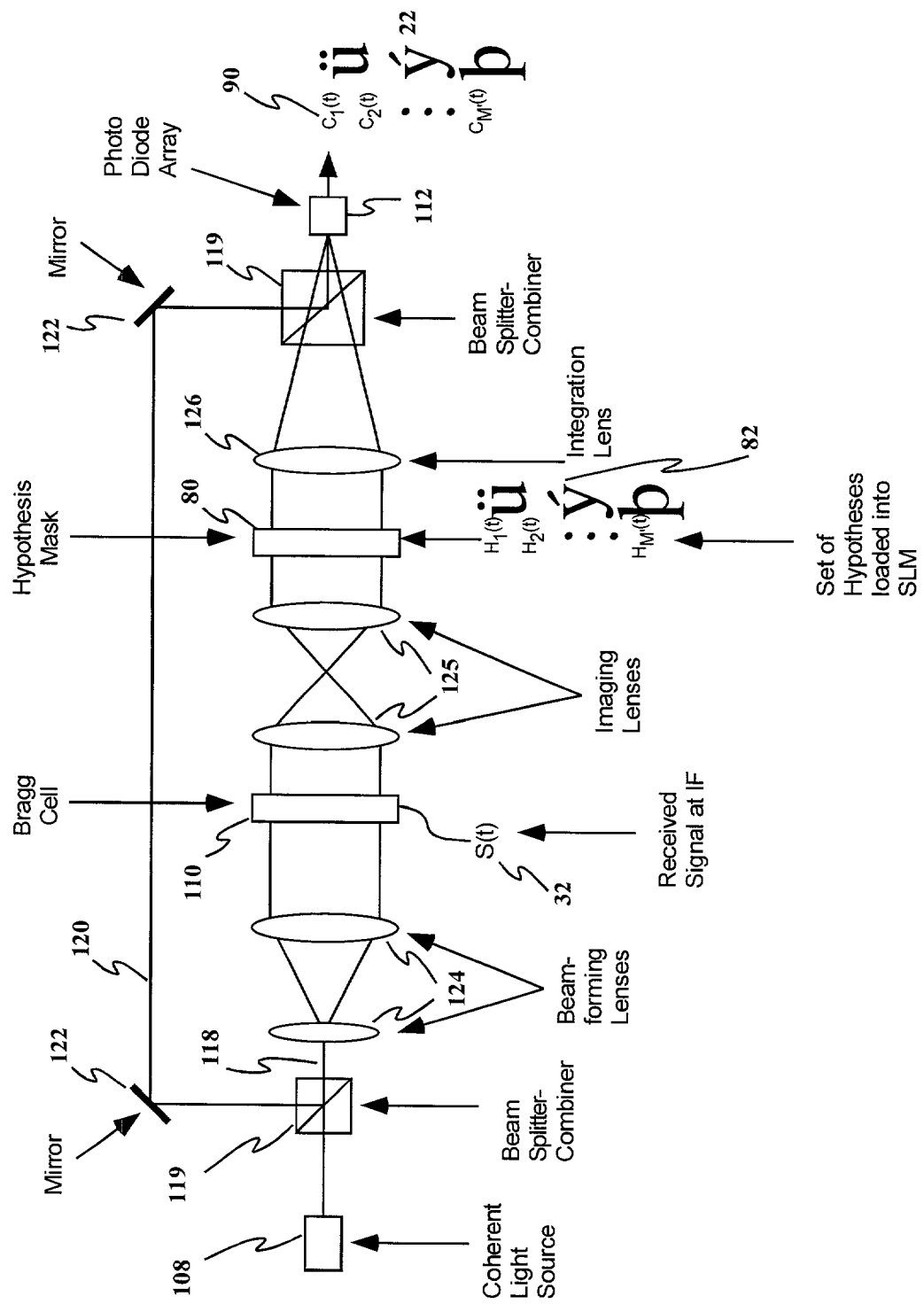
FIG. 14: Space Integration Traveling Wave Displacement Architecture with Coherent Detection

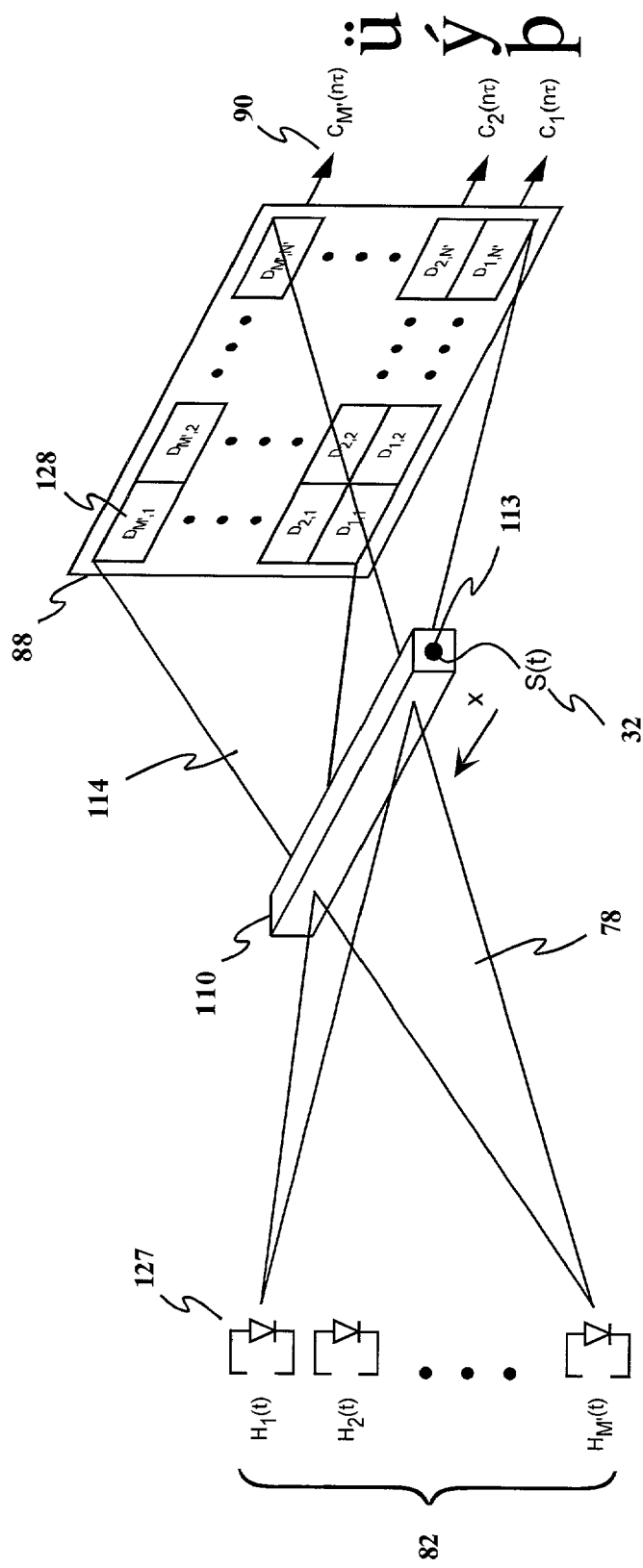
FIG. 15: Detector Integrating, Traveling Wave Displacement Architecture

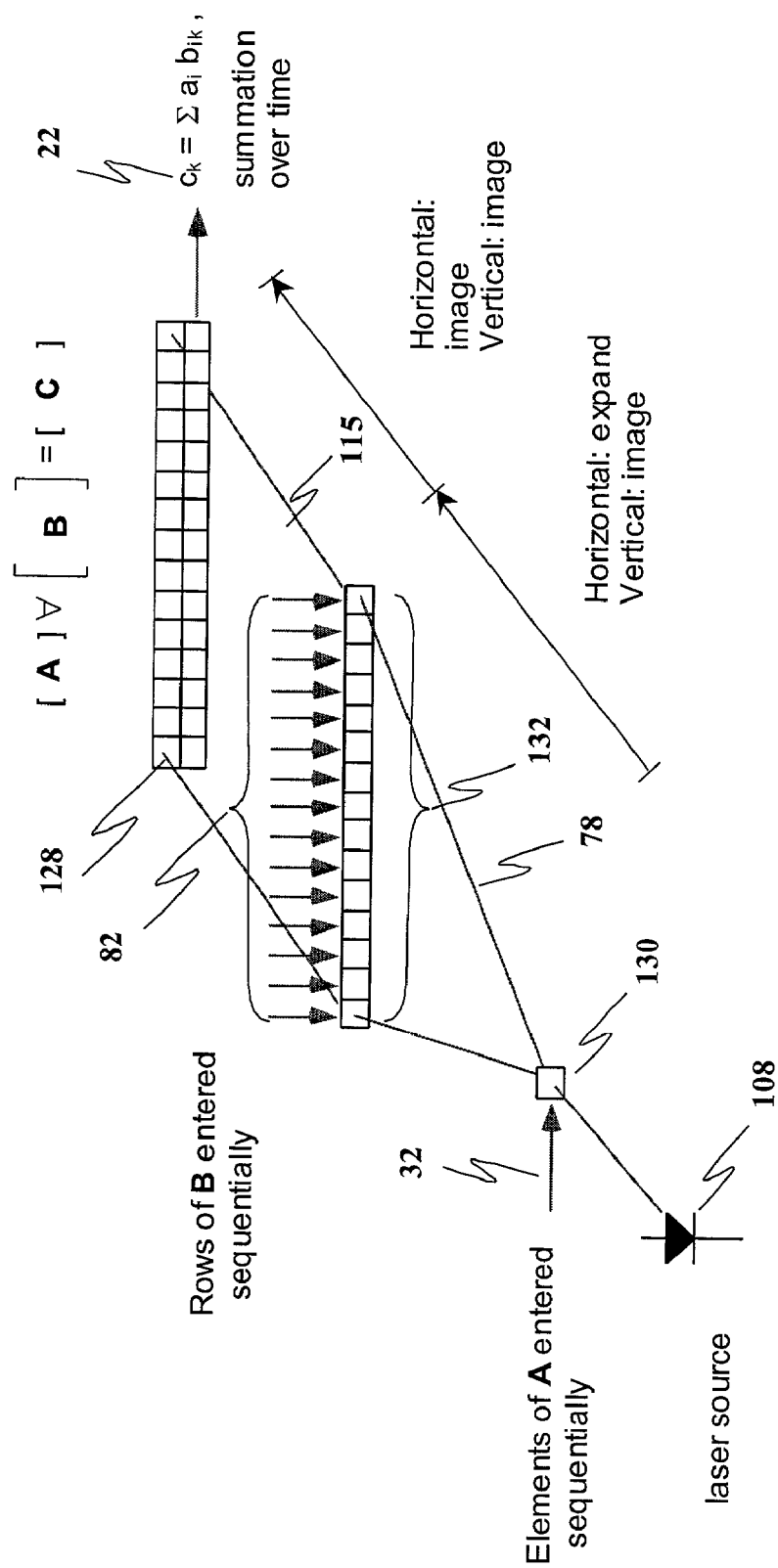
FIG. 16: Time Integrating Vector-Matrix Multiplier

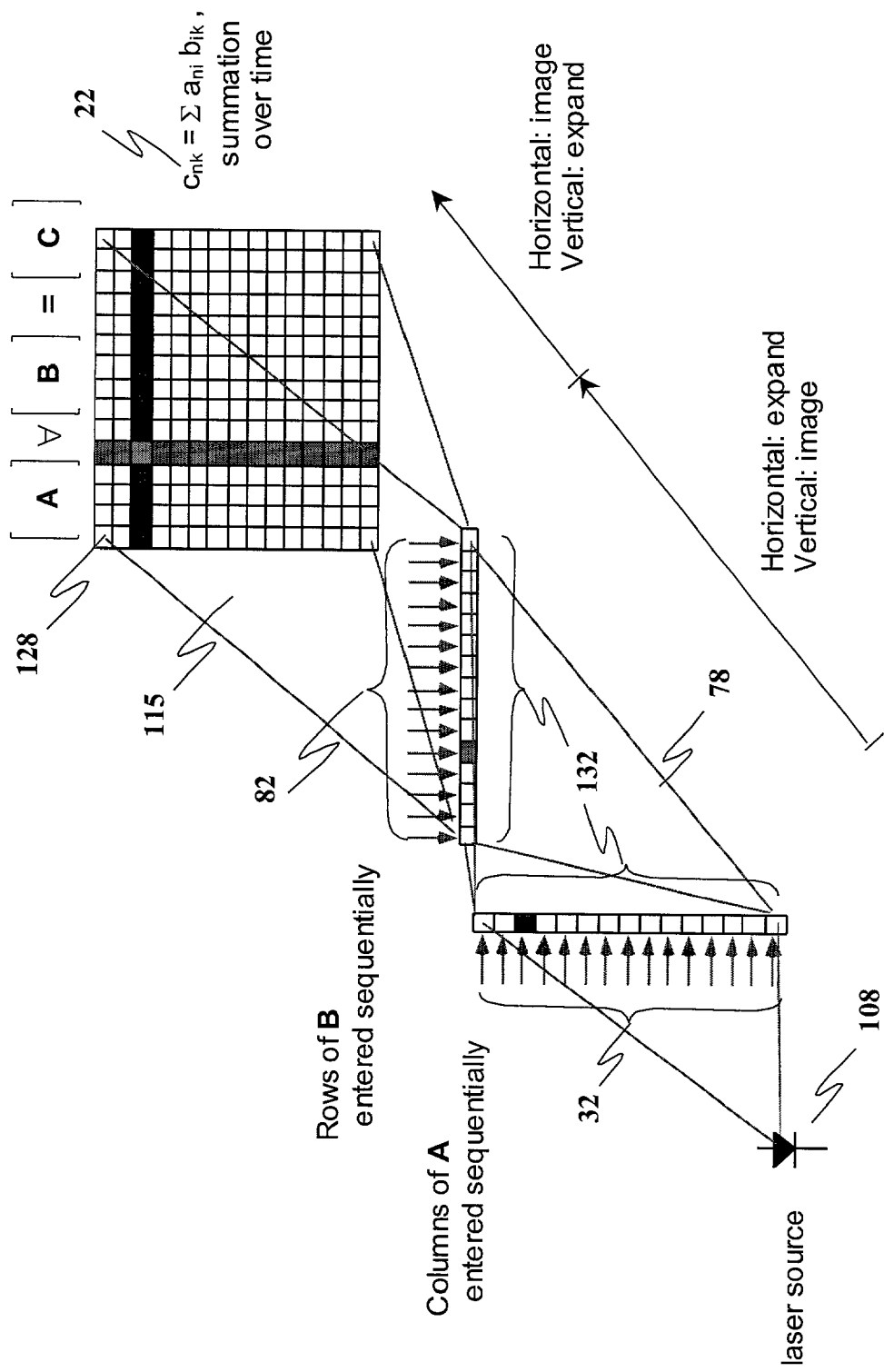
FIG. 17: Time Integrating Matrix-Matrix Multiplier

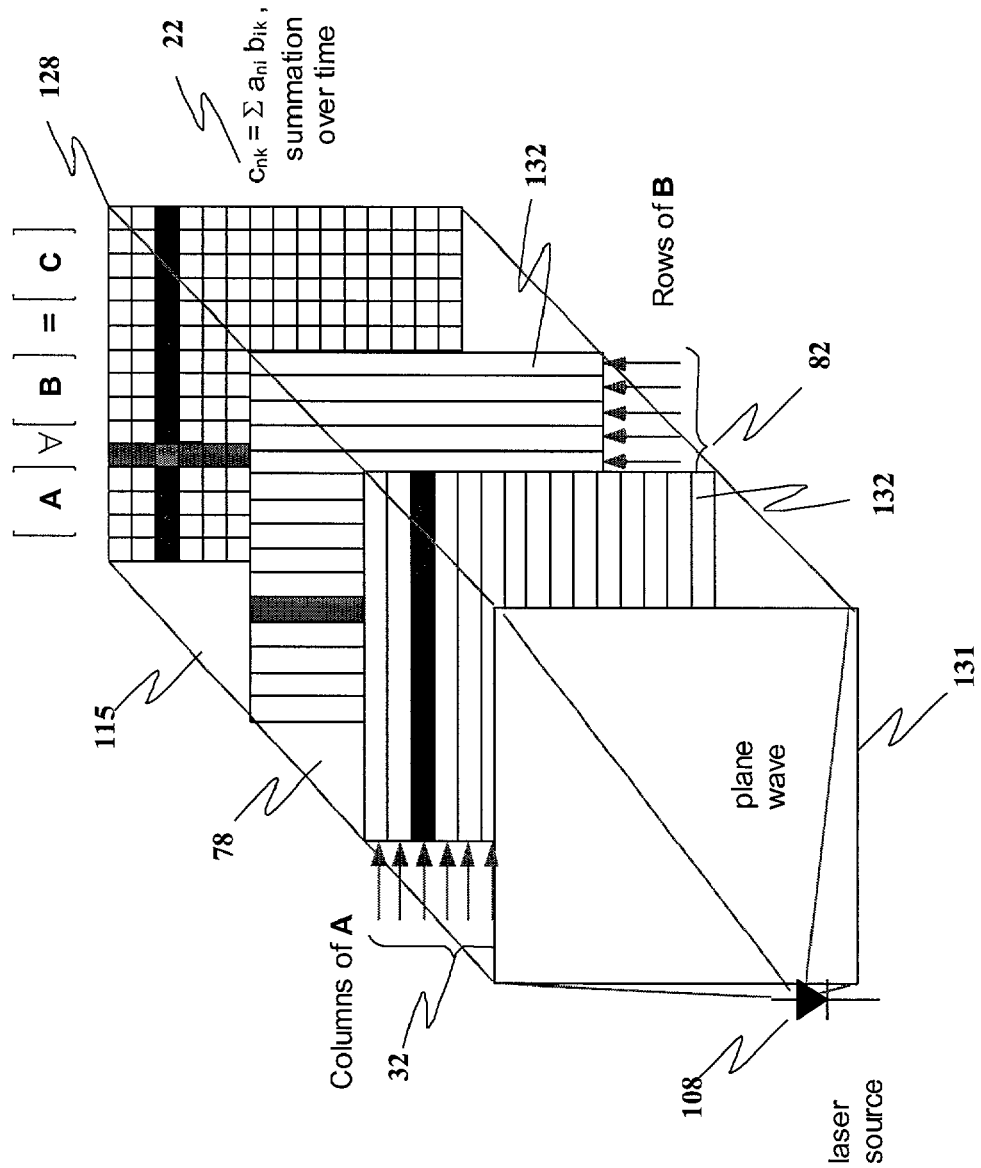
FIG. 18: Compact Time Integrating Matrix-Matrix Multiplier

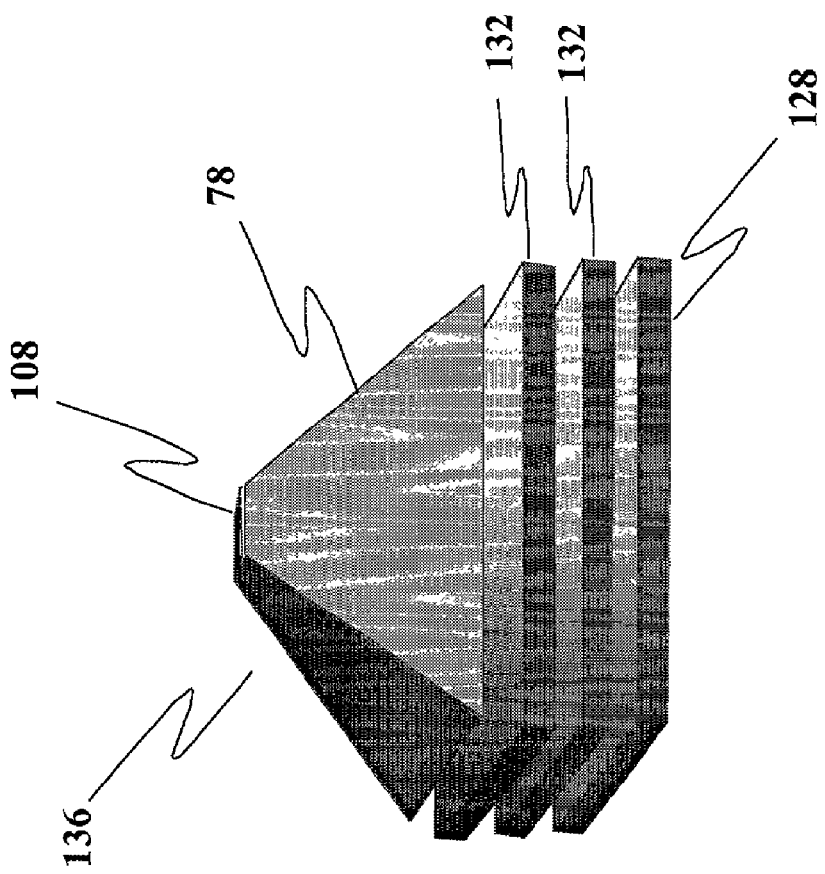
FIG. 19: Compact Module Stack

OPTICAL PROCESSOR ENHANCED RECEIVER ARCHITECTURE (OPERA)

BACKGROUND OF THE INVENTION

1. Field of the Invention

The present invention relates to interference cancellation in multiple access communications systems which permit multiple simultaneous users. Well-known applications include cellular telephone systems, Personal Communications Services (PCS), wireless Local Area Networks (LAN), etc. These systems must rapidly identify and separate the transmissions of each user from the interference or "noise" that is represented by all the other simultaneous users. It will be appreciated that the task of identifying and separating all simultaneous transmissions—in real time—is enormously complex. The more simultaneous users, the harder this task becomes. The result is a significant bottleneck in the receiving and information identification functions of these systems.

Current systems have attempted to minimize the complexity of the identification task by simply limiting the number of simultaneous users, well below what is theoretically possible. Limiting the number of simultaneous users places an artificial limitation on the bandwidth capacity used at any one time—that is, such current systems do not make full use of the bandwidth available to them. Such systems are thus downsized to accommodate the bottleneck.

In the example of cellular telephony, permitting a larger number of callers would increase the noise levels above the system's capacity to identify and eliminate it. The system would not be able to separate each user's transmission from the noise that is the other users' transmissions. Users may encounter dropped or disconnected calls or transmissions (as additional users access the system), or the system may become temporarily "unavailable" to users wanting to place calls or transmit data. Moreover, as user demand continues to increase, service providers face intense pressure to reliably service more users simultaneously. There is an urgent need for an improved receiver function which can accommodate greater numbers of simultaneous users, while performing the information identification functions necessary to separate the transmissions.

Complex mathematical algorithms (referred to herein as "receiver algorithms") have been developed which could assist in the task of signal-to-noise enhancement. They are not presently used in communications systems due to limited ability to generate the large quantities of data needed. These receiver algorithms operate by estimating interference and/or by estimating signal parameters. Each signal must be rapidly and repeatedly correlated against known or estimated information ("hypotheses"). These hypotheses may include, for example, the unique codes assigned by the system to each transmission or portions thereof. A computer processor equipped to generate the required number of simultaneous calculations would be too large, too heavy and too costly to be of practical utility. Consider, for example, that in cellular telephone systems, the equipment for rapidly identifying and separating the transmissions is located on or near each receiving tower.

In a preferred embodiment, the present invention employs multichannel optical correlators to great advantage to allow commercial implementation of receiver algorithms in multiuser systems. The multichannel optical correlators conduct parallel (simultaneous) processing of the signal against huge numbers of hypotheses to generate data ("correlations") useful in identifying each transmission. This parallelism makes optical correlators uniquely and ideally suited for processing complex data streams and simultaneously conducting billions of calculations to generate data (correlations) with respect to the individual transmissions in that stream. The data generated by use of the optical correlator is fed to one or more receiver algorithms, which then identify, sort and separate the transmissions of the various simultaneous users. In this manner, multiuser communications systems will be able to maximize bandwidth usage to accommodate significantly larger numbers of simultaneous users than is possible today.

Additional technical background information and definitions are found following the Detailed Description of this disclosure, identified as "Technical Background." This section also provides further identification for some of the acronyms used in the description in accordance with the present invention.

2. Description of Related Art

A variety of approaches have been suggested to remove unwanted interference from desired signals in communications systems. As described above, the complexities of this task can increase exponentially with increasing numbers of simultaneous users and increasing length of transmission per user.

A large majority of these prior approaches require a bank of matched filters and/or correlators. Purely digital systems have been employed to perform correlation/matched filter function, as, for example, in U.S. Pat. No. 5,903,550 (Spock), which describes a digital system to perform demodulation of a CDMA signal with many time offsets and demodulating different users sequentially in time. Disclosed in the Spock patent without detail is a "parallel despread" and a "parallel chip integration" that forms a parallel correlator. This correlator (which is not an optical correlator) works on a set of stored samples of the incoming signal.

Analog correlators are disclosed in the prior art. U.S. Pat. No. 4,267,580 (Bond et al.), U.S. Pat. No. 4,813,006 (Burns et al.), U.S. Pat. No. 5,126,682 (Weinberg et al.) and U.S. Pat. No. 5,276,705 (Higgins) are all examples of analog correlators based on charge coupled device (CCD) technology. While these references do not specifically identify the communications applications taught herein, the use of CCD correlators is well known. U.S. Pat. No. 3,937,942 (Bromley) describes the use of a certain class of photosensors known as Time Delay and Integrate (TDI) sensors for correlating an unknown incoming signal with one or more of a great number of stored known reference signals. The devices disclosed in these patents are suitable for use as components in the improved receivers in accordance with the present invention, and the patents listed in this paragraph are incorporated herein by reference.

Various optical systems, including optical correlators, have been used previously in other contexts or for processing received signals for various other purposes. Two-dimensional (2-D) optical correlators are known to the art, particularly in pattern matching applications, such as fingerprint identification or military targeting applications. The utility of such correlators in the present invention is doubtful. Two-dimensional correlators correlate a single 2-D object, such as an image, against a single 2-D hypothesis, generally testing all possible 2-D (x and y dimensions) offsets of the hypothesis. In general, they perform a single 2-D integration. By contrast, the optical correlators most useful in the present invention are those that can correlate a single, one-dimensional (1-D) object against a large set of 1-D hypotheses, producing multiple results. That is, the bank of 1-D correlators performs a set of independent 1-D integrations.

Optical correlator architectures suitable for use in accordance with the present invention possess the quality of using the two available dimensions separately as individual codes in one dimension and time offsets in the other. In addition, the correlator preferably has the facility for introducing a set of vectors of hypotheses values into the optical beam in parallel, and providing as output a time-varying vector representing the results of the correlation of each of the hypothesis at one time offset where the time offsets can vary in time.

Suitable optical correlators of various architectures are known to the art. U.S. Pat. No. 4,225,938 (Turpin) describes several time-integrating acousto-optic correlator processors for performing correlation and other functions. Of particular interest is the description of time-integrating correlation of columns 3–4. U.S. Pat. No. 4,833,637 (Casasent et al.) describes an acousto-optic multichannel space integrating correlator. U.S. Pat. No. 4,468,093 (Brown) describes the use of a space/time integrating optical processor for performing time versus frequency cross-correlation. U.S. Pat. No. 4,620,293 (Schlunt et al.) illustrates a type of optical correlator for performing a linear multiplication operation and U.S. Pat. No. 4,843,587 (Schlunt et al.) illustrates an optical correlator for performing matrix multiplication. The optical correlators disclosed in these patents are suitable for use in the improved receivers in accordance with the present invention, and the patents listed in this paragraph are incorporated herein by reference.

However, none of these references teach or suggest the use of optical correlation technology to generate the matrices of data needed for receiver algorithms. The present invention thus makes a marked advance in communications technology by providing a highly efficient method and apparatus for generating such data matrices for use in various receiver algorithms.

SUMMARY OF THE INVENTION

Multichannel optical correlators are advantageously used according to the present invention to enhance the performance and capacity of multiple access communications systems. Specifically, the present invention permits complex receiver algorithms to be employed in interference cancellation operations. This enables the communications systems to identify and separate the transmissions of each user from the interference represented by all the other simultaneous users.

In general, the optical correlators may be arranged as one or more banks or arrays of one-dimensional (1-D) optical correlators. The correlators operate by performing hypothesis testing over a large number of possible scenarios. The data (correlations) thus generated are provided to one or more complex signal-to-noise enhancement algorithms, such as those intended to perform multiuser detection, multipath combining, Doppler compensation, etc. Thus, the use of multichannel correlators according to the present invention permits complex receiver algorithms to be utilized in solving significant interference problems associated with multiple access communications systems.

It is a primary object in accordance with the present invention to provide improved communications receivers capable of substantially eliminating interference between multiuser signals, thereby offering bandwidth efficiencies which approach that of a single-user system.

It is a related object to enable multiple access communications systems to make better utilization of valuable bandwidth and to therefore serve a larger number of simultaneous users.

Another object in accordance with the present invention is to couple multichannel optical correlators with complex multiuser receiver algorithms.

It is a more specific object to enable the use of such complex algorithms to solve multiuser detection problems inherent in various wired or wireless DS/SS CDMA communications systems, such as, for example, cellular telephone systems, Personal Communications Services (PCS), Local Area Networks (LAN), Local Multipoint Distribution Services (LMDS) and the like.

A further specific object is to combine multichannel optical correlators with any of a variety of MUD algorithms to achieve near-optimum detection of each separate individual transmitter for removal of MAI.

Another specific object is to combine multichannel optical correlators with RF multipath combining algorithms to improve performance where such multipath exists.

An additional specific object in accordance with the present invention is to use multichannel optical correlators to provide estimates of any existing Doppler shift on the received RF signal.

These and other objects and advantages in accordance with the present invention will become more readily apparent from a consideration of the ensuing description, claims, and accompanying drawings.

BRIEF DESCRIPTIONS OF THE DRAWINGS

FIG. 1 illustrates an example of a single user matched filter correlation receiver (prior art).

FIG. 2 illustrates an example of a multi-user matched filter correlation receiver (prior art).

FIG. 3 is a block diagram illustrating an example of the combination of a multichannel optical correlator with illustrative receiver algorithms according to the present invention.

FIG. 4 shows, in block diagram, an expanded view of the multichannel optical correlator of FIG. 3, in an example illustrating the configuration of optical correlators for performing complex correlation at baseband.

FIG. 5 shows, in block diagram, an expanded view of the multichannel optical correlator of FIG. 3, in an example illustrating complex correlation at an IF frequency.

FIG. 6 illustrates an example of a Detector Integrating Detector Displacement architecture for an optical correlator in accordance with the present invention.

FIG. 7 illustrates an example of a compact construction which may be used to embody the architecture of FIG. 6.

FIG. 8 is a mathematical representation of the correlation operation illustrated in FIG. 6.

FIG. 9 illustrates an example of a simplified Detector Integrating Detector Displacement (DIDD) architecture for an optical correlator in accordance with the present invention, using an integrated mask and time-delay and integrate (TDI) detector.

FIG. 10 illustrates an example of a general integrated mask and time-delay and integrate detector for use in the DIDD architecture of FIG. 9.

FIG. 11 illustrates an example of a simplified binary mask version of an integrated mask and time-delay and integrate (TDI) detector for use in the DIDD architecture of FIG. 9.

FIG. 12 illustrates an example of the Space Integration Traveling Wave Displacement architecture for an optical correlator in accordance with the present invention.

FIG. 13 illustrates an example of a single channel of the SITWD architecture of FIG. 12.

FIG. 14 is a top view of one variation of the SITWD architecture of FIG. 12.

FIG. 15 illustrates an example of a Detector Integrating, Traveling Wave Displacement architecture for an optical correlator in accordance with the present invention.

FIG. 16 illustrates an example of a Time-Integrating Vector-Matrix Multiplier architecture for an optical correlator in accordance with the present invention.

FIG. 17 illustrates an example of a Time-Integrating Matrix-Matrix Multiplier architecture, a variation of the architecture of FIG. 16 with expanded input to conduct parallel loads rather than serial loads.

FIG. 18 illustrates an example of an embodiment of the Time-Integrating Matrix-Matrix Multiplier architecture of FIG. 17.

FIG. 19 is a conceptual illustration of a compact module stack embodying the architecture of FIG. 18.

DETAILED DESCRIPTION OF THE INVENTION

The following detailed description is of the best presently contemplated modes of carrying out the present invention. This description is not to be taken in a limiting sense, but is made merely for the purpose of illustrating the general principles in accordance with the present invention. The scope of the present invention is best defined by the appended claims.

The present invention may be very useful in spread spectrum (SS) communications systems, that is, communications systems in which the transmission band is greater than signal bandwidth. The present invention is considered to have particular utility in spread spectrum Code Division Multiple Access (CDMA) systems, and most particularly in Direct Sequence Spread Spectrum CDMA (DS/SS CDMA) systems (see Additional Technical Background, below). The present invention may be applied in other spread spectrum systems as well, including, but not limited to, Frequency Hop, OFDMA, Hybrid Frequency Hop, Ultra Wideband (UWB), CAMA (Convolution Ambiguity Multiple Access) systems. The present invention may also find utility in Time Division Multiple Access (TDMA) and Frequency Division Multiple Access (FDMA) communications systems.

As mentioned, the present invention is particularly applicable to receivers used in DS/SS CDMA communications systems. For convenience, the present invention is described and illustrated herein with reference to several embodiments advantageously applied in DS/SS CDMA wireless systems where the signals are transmitted through free space occupying a particular assigned radio frequency (RF) band. Such systems are increasingly being utilized in cellular telephone systems, Personal Communications Services (PCS), wireless Local Area Networks (LAN), Local Multipoint Distribution Services (LMDS) and the like. Nevertheless, it is understood that the enhanced receivers in accordance with the present invention will be similarly applicable to other communications systems using DS/SS CDMA, such as wired LANs and fiber-optic distribution systems where the signals are not transmitted in free space and may occupy a frequency band centered at zero (0) frequency (baseband).

The improved optical correlation method and receiver in accordance with the present invention operate on an analog signal. They are therefore conveniently employed at the "front-end" of a communications receiver, thereby eliminating the need for digitizing or sampling the signal prior to processing it. The present invention is thus particularly well suited for application in a wireless communications system. However, the present invention also can be utilized in a digital environment by first converting the digital or sampled signal to analog. Various digital-to-analog converters are well known.

In all of these communications systems, the signals generated by multiple simultaneous users represent noise with respect to each other. This is referred to as Multiple Access Interference or MAI. This MAI limits the signal-to-noise ratio (SNR) such that only a fraction of the number of possible users can actually use the system simultaneously, resulting in a very significant underutilization of expensive bandwidth. To maximize the number of simultaneous customers or users, multiple access systems should be able to identify and remove various forms of interference, or "noise," so that each desired transmission, for example, a phone call, is received clearly and accurately.

In the simplest receiver, each user would correlate the received signal, comprising the sum of all users transmitting at that instant in time, with its assigned pseudo-random (PN) code (described further in the Technical Background section, below). FIG. 1 illustrates an example of a simple prior art single user detector operating in a multiuser environment, known as Single User Detection (SUD). The presence of signals 10 from other users is treated by SUD as uncorrelated white noise. As indicated in FIG. 1, a simple matched filter correlator 20 may be used. However, this noise actually is not uncorrelated, but is highly structured This results in rather low rejection of other users' transmissions and increased error rates. Thus, this approach, while used commercially, is quite inefficient in eliminating interference.

For a multiuser communications system to obtain its full potential, more complex receiving methods are required. These methods are known collectively as Multiple User Detection (MUD). FIG. 2 illustrates an example of a multiuser detector which essentially combines a set of single user detectors, each correlating one waveform from the set of received waveforms, providing correlation data to a MUD process.

A number of receiver algorithms have been developed to attempt to address this MUD problem. Background information regarding various MUD algorithms and their complexity is found in the Technical Background section, below.

These algorithms are intended to remove MAI based on knowledge about the other users. Such knowledge can be known a priori, but preferably is derived from the received signal. In this way, the system can adapt to the changing conditions of the dynamic communications system. In theory, MAI is predictable, based on the structure of the code sequences in use at any given point in time.

If a MUD algorithm could be implemented in a multiuser communications system, such as a CDMA system, the permitted number of actual simultaneous users would increase by a factor of two to three over an SUD-based system, very significantly increasing bandwidth efficiency. As described herein, the present invention enables the use of various MUD algorithms in a multiuser communications system by utilizing optical correlator technology.

Communications receivers perform other signal processing tasks as well, such as identifying and removing multipath interference, calculating and adjusting for probable RF frequency offsets resulting from Doppler shifting of the RF carrier, compensating for channel fading, and the like.

Algorithms of varying types and complexities are employed in identifying these types of interference, as described further below. Multipath interference arises because each transmitted signal travels a number of paths from the user's remote unit to the receiver, as the RF signal is reflected off buildings and other obstacles, thus arriving at the receiver at various time offsets from that of the main path. RF multipath combining algorithms, such as the RAKE algorithm, are well known for recombining the multipath signals, providing an increase in signal quality. RAKE receivers are taught, for example, in U.S. Pat. No. 5,684,793 (Kiema et al.).

Thus, the receiver must simultaneously decode (or despread) the information to restore it to its original bandwidth, separate it from the information being transmitted by the other simultaneous users (MAI), and also eliminate various other forms of interference. In general, the more information available about the intended and interfering users available, the more effective a MUD or multipath combining algorithm or other RF compensation process can be made. At any instant in time, information of value to a receiver algorithm, may include all codes being transmitted, the relative phases of the codes with respect to each other, the clock rate of each code, the RF amplitude and RF phase of each received code, and the Doppler, multipath and fading characteristics of the received RF signal for each code. Because the operational environment of the communications system is dynamic, this information should continuously be estimated to adapt to changing conditions.

Moreover, particularly in wireless telephony applications, these calculations and compensations should all occur in real time to prevent loss of data. In accordance with the present invention, the efficiency of multiple access communications systems can be very dramatically enhanced by using optical correlator technology for processing received information in order to identify and remove interference from the received signal.

It now has been found that a multichannel optical correlation processor configured as a bank of 1-D correlators can easily provide the computational requirements of the foreseeable future. In general, for an optical correlation processor, the dimensions of the correlation matrix are determined by the size of the photodetector array or spatial light modulator.

For the sake of illustration, a useful working number for these components is 1024×1024. However, due to the need for accurate bias removal, half of the rows may be used to compute the inverse of the correlation function to be subtracted from the true correlation function, thus reducing the effective size to 1024×512. The parallelism of the optical technology allows a multiply-accumulate to be performed at each matrix site simultaneously, achieving a parallelism equal to the number of matrix entries. These multiplies occur, in parallel, at a rate equivalent to the bandwidth of the correlator system or applied signal, whichever is less. The system bandwidth is dependent on the chosen architecture and can be many gigahertz.

Consider, for example, two correlator systems, one operating at a bandwidth of 20 MHz useful for present-day CDMA systems and one operating at a bandwidth of 1 GHz suitable for hypothetical future systems, both producing a 1024×512 correlation matrix. Thus, an optical correlator of the type described in the present invention can provide from 10,485,760 MMACs to 524,288,000 MMACs ($1\times10^7$ to $5\times10^8$), or the equivalent of 2,000–100,000 of the current best DSPs.

As stated above, the present invention may be advantageously applied in receivers for a variety of DS/SS CDMA communications systems. The detailed alternative embodiments illustrate applications of the present invention in wireless DS/SS CDMA communications systems, coupling multichannel optical correlators with multiuser receiver algorithms in order to detect and remove interference. In these preferred embodiments, the enhanced receivers comprise signal receiving means, an optical processor configured as a bank of 1-D optical correlators for identifying the presence of particular waveforms and estimating the relative time delay or delays, code phases, carrier frequency offset from expected, RF amplitude and RF phase for each received spread spectrum waveform present in the received plurality of signals; a controller for determining and providing to the optical processor the appropriate set of reference hypotheses; and receiver algorithms dependent on the exact receiver function to be performed. It will be understood that these specific preferred embodiments are illustrative of the present invention, and those of ordinary skill in the art will understand its application in the other communications systems indicated herein.

Several basic aspects in accordance with the present invention are illustrated in FIG. 3, which shows an improved receiver in accordance with the present invention implemented in communications system. Basic components of the illustrated system include receiving means or antenna 12 for receiving a plurality of signals 10 transmitted through a communications channel; signal conversion means 14 for converting received signals 10 into a form suitable for input to a multichannel optical correlator; multichannel optical correlator 30 for identifying the presence of particular waveforms and estimating the relative time delay or delays, carrier frequency offset from expected, RF amplitude and RF phase for each received spread spectrum waveform present in the received plurality of signals; controller 16 for determining and providing to multichannel optical correlator 30 the appropriate set of reference hypotheses 18; and one or more receiver algorithms 38, depending on the exact receiver function to be performed. Multichannel optical correlator 30 of FIG. 3 can be configured to comprise one or more banks of one-dimensional correlators.

Correlation Function

Understanding an example of a correlation function performed by the present invention is useful in considering the embodiments and architectures described in detail below.

It has long been known to use filters of various forms to eliminate unwanted portions of information, such as a received signal. At the most elementary level, a simple filter acts to remove or excise known portions of the information or signal, by preventing their passage in a basic gate-keeping function. Matched filters, shown in FIGS. 1 and 2, perform a somewhat more sophisticated operation, utilizing more selective and complex sets of criteria to enhance the desired signal. Matched filters can be digital, analog or optical. Parallel matched filters, or parallel correlators, employ a plurality or bank of matched filters arranged in parallel. Each matched filter can be based on different selection criteria, to perform complex correlations. Correlation is one technique that can be used to supply information to MUD and other RF processing functions.

Correlation is the measurement of similarity of one or more characteristics of two entities. In accordance with the present invention, these entities may be a received waveform and a hypothesis of that waveform. This measurement may be expressed as:

$$r(\tau) = \int_0^T f_1(t-\tau) f_2(t)\, dt \quad (1)$$

where $f_1(t)$ and $f_2(t)$ are the received waveform and the hypothesis, $\tau$ is the time shift between $f_1(t)$ and $f_2(t)$, T is the time interval over which the correlation is measured and $r(\tau)$ is the measured correlation at a particular time offset $\tau$. To measure the correlation as a function of time offsets, the measurement as given in Equation (1) is made for a set of N $\tau$'s, producing a set, or vector, of N correlation values designated $C_n(\tau_n)$.

$$C_n(\tau_n) = [r(\tau_1), r(\tau_2), \ldots, r(\tau_n)] \; n=1, 2, \ldots N \quad (2)$$

In the example of the multiuser telecommunications system, the correlation of the received signal against the set of possible users at a set of possible time offsets is desired. This is accomplished by evaluating the vector $C_n(\tau_n)$ given in Equation (2) for a set of M hypotheses, $H_1, H_2, \ldots H_M$, corresponding to the set of M possible users, to form the two dimension array, or matrix, of correlation values $C_{m,n}(H_m, \tau_n)$ of size M×N $$C_{m,n}(H_m, \tau_n) = \quad (3)$$

$$\begin{bmatrix} C_1(\tau_n) \\ C_2(\tau_n) \\ \vdots \\ C_m(\tau_n) \end{bmatrix} = \begin{bmatrix} r_1(\tau_1), r_1(\tau_2), \ldots, r_1(\tau_n) \\ r_2(\tau_1), r_2(\tau_2), \ldots, r_2(\tau_n) \\ \vdots \\ r_m(\tau_1), r_m(\tau_2), \ldots, r_m(\tau_n) \end{bmatrix} \begin{matrix} m = 1, 2, \cdots M; \\ n = 1, 2, \cdots N \end{matrix}$$

where the correlation values, $r_m(\tau_n)$, are computed from Equation (1) by either allowing $f_1$ to be the received signal, $S(t)$ at the $n^{th}$ time offset, $\tau_n$, and $f_2$ be the $m^{th}$ hypothesis, $H_m$, as shown in Equation (4), $$r_m(\tau_n) = \int_0^T S(t-\tau_n) H_m(t)\, dt \quad (4)$$

or by allowing $f_1$ to be the $m^{th}$ hypothesis, $H_m$, at the $n^{th}$ time offset, $\tau_n$, and $f_2$ be the received signal, $S(t)$, as shown in Equation (5).

$$r_m(\tau_n) = \int_0^T H_m(t-\tau_n) S(t)\, dt \quad (5)$$

In either case, the value $C_{m,n}(H_m,\tau_n)=R_m(\tau_n)$ in Equation (3) is the value of the correlation between the received waveform $S(t)$ and the $m^{th}$ hypothesis, $H_m$, at the $n^{th}$ time offset, $\tau_n$, between them.

In a multiuser system in the presence of multipath, the received waveform, $S(t)$ is composed of the summation of a set of unique waveforms arriving at the receiver with various time delays corresponding to the multipath conditions, as shown in Equation (6)

$$S(t) = \sum_{m=0}^{M'} \sum_{n=0}^{N'} a_{m,n}(t) e^{j\phi_{m,n}(t)} S_m(t-\tau_n) \quad (6)$$

where the quantities M' and N' are, respectively, the number of unique waveforms, S, received at time t and the number of multipath delays, $\tau$, present at time t. The variable $a_{m,n}(t)$ is the magnitude and $\phi_{m,n}(t)$ is the phase of the complex amplitude of the $m^{th}$ waveform through the $n^{th}$ multipath channel at time t.

Viewing Equation (3) in light of Equation (6), each correlation value $C_{m,n}(H_m,\tau_n)$ represents the sum of each correlation of the hypothesis $H_m$ and each of the M' unique waveforms and N' multipath delays present at time t within $S(t)$. When a particular hypothesis, $H_m$, matches one of the unique waveforms at one of the time delays, the magnitude of that $C_{m,n}(H_m,\tau_n)$ entry is maximized and the quantity $C_{m,n}(H_m,\tau_n)$ is generally referred to as an autocorrelation. Otherwise, the quantity $C_{m,n}(H_m, \tau_n)$ is generally referred to as a cross-correlation. In the general case of multiple signals with multiple time delays, a correlation is composed of the autocorrelation and the sum of all cross-correlations. If no autocorrelation is present, the each $C_{m,n}(H_m,\tau_n)$ quantity is composed of only the sum of cross-correlations. Repeating the measurements for each of a series of time instances produces a time-varying correlation matrix, $C_{m,n}(t,H_m,\tau_n)$. Furthermore, each $C_{m,n}(t,H_m,\tau_n)$ entry is a complex value with the magnitude measuring the correlation value and the phase measuring the RF phase difference between the hypothesis and received waveform.

When the set of hypothesis and time delays tested encompasses all possible combinations of waveforms and time delays, then the correlation matrix of Equation (3) fully describes the MAI conditions of the received waveform. This correlation matrix can then be subsequently used to estimate and remove interference from a particular $S_n(t)$ due to all other waveforms present, resulting in an optimum reception of $S_n(t)$.

Optical correlators have the advantage of great efficiency in rapidly conducting complex correlations. The present invention provides improved performance over conventional technology by taking advantage of the ability of optics to perform parallel operations over a large data space to provide the information required by advanced MUD algorithms. The inherent parallelism available in an optical processor allows simultaneous calculation of the contribution of an instance in time of $S(t)$ to all elements of the correlation matrix $C_{m,n}(H_m,\tau_n)$. This ability of an optical processor to test many hypotheses in parallel is a key element in accordance with the present invention.

The class of optical correlators of value in the present invention are configured as a bank of 1-D correlators. The architectures most suitable for use in accordance with the present invention possess the quality of using the two available dimensions separately as individual codes in one dimension and time offsets in the other. In addition, the correlator should have the facility for introducing a set of vectors of hypothesis values into the optical beam in parallel and providing as output a time-varying vector representing the results of the correlation of each of the hypothesis at one time offset where the time offsets can vary in time. As indicated above, various architectures have been developed for performing optical correlation, and it will be apparent to those skilled in the art to select and construct an appropriate architecture for a desired correlation.

One configuration of an optical correlator useful in a communications receiver uses one dimension to correspond to a hypothesis waveform and the second dimension to correspond to the time offset of the received signal with respect to the hypothesis waveform. For the example of an RF CDMA receiver, the hypotheses are the set of binary PN sequences expected to be contained within the received waveform. The input to be tested against the hypotheses is the received RF signal. The output from the optical correlator is the correlation between each PN sequence and the received RF signal for a multitude of time offsets (delays) between the presumed PN sequence and the received RF, integrated over some time interval, corresponding to the correlation matrix of Equation (3) above.

This correlation matrix, when implemented to process complex (real and imaginary) data to produce complex (real and imaginary) results, may provide measures of which code is being transmitted, the code phases, the multipath for each code, the RF amplitude of each code, the RF phase of each code. A set of such observations collected over time may provide information about the channel fading for each code and chip rate for each code. Current technology for optical processors would allow parallel testing of as many as 1024 PN sequences against 1024 contiguous time delays, corresponding to M' and N' in Equation (6) respectively.

Preferred Embodiments

Objectives in accordance with the present invention are achieved by the inclusion of an optical correlation processor providing information regarding a large number of received waveforms. Such information can be advantageously applied to various receiver algorithms. The optical processors useful in the present invention are configured generally as a bank of one-dimensional (1-D) correlators. Variations on this general configuration are described herein as preferred embodiments or architectures. Other variations within the scope of the present invention may be appreciated from this description and from knowledge of optical processing.

An example of an embodiment of the present invention is depicted generally in the block diagram of FIG. 3, where the general components in accordance with this embodiment are shown in the context of a multiuser communications system. Signal 10 comprising multiuser signals (depicted as $S_1(t)$, etc.), is received by receiving means or antenna 12, and passed through signal conversion means 14 to generate converted signal 32. Receiving means 12 is selected in accordance with the particular application in accordance with the present invention. Such receivers are well known in communications systems, such as the DS/SS CDMA systems used to illustrate the preferred embodiments.

Signal conversion means 14 may employ any signal conversion means useful in communications receivers, and may take on various forms as appropriate to the specific system. Examples include, without limitation, RF-to-IF conversion (simply shifting the center frequency of the signal), Quadrature RF to Baseband Conversion producing separate I and Q outputs, digital to analog conversion for adapting to a digital receiver, etc. The exact form would be dependent on the correlator architecture and the communications system in which it operates.

Controller 16 may be any convenient controller means selected to provide a plurality of hypothesized waveforms (reference hypotheses 18 to be tested) to multichannel optical correlator (or multichannel optical correlation processor) 30. Controller 16 may also control the overall system timing, i.e. when correlators 30 start and when output 22 is taken. It functions to control the particular operation multichannel optical correlator 30 is performing and coordinate actions with receiver algorithms 38. Controller 30 may be a general-purpose computer, or a less general but faster digital signal processor, or any other convenient digital and analog hardware capable of performing these functions.

In one embodiment of the configuration depicted in FIG. 3, optical correlator-generated correlation matrix output 22 is provided to one or more receiver algorithms 38 (that is, optional set-on demodulators 34 are not used). Receiver algorithms 38 may be any signal-to-noise enhancement algorithms which operate by estimating interference and/or by estimating signal parameters. Many such algorithms are known and may be implemented with the present invention. It will be appreciated that any algorithms developed which exhibits these general characteristics may be suitable employed in the present invention. For example, known Multiuser Detection (MUD) algorithms, RAKE multipath combining algorithms, and Doppler shift compensation algorithms may be employed, as may Doppler/RAKE combination algorithms, Time Delay compensation algorithms (i.e., for use with RAKE), and Time Compression compensation algorithms. In general, the operation of receiver algorithm(s) 38 permits more precise interference cancellation in data recovery functions 24. Receiver algorithms 38 will be selected based on the exact receiver function to be performed with respect to signal 10.

In another embodiment of the configuration depicted in FIG. 3, optional set-on demodulators 34 may be employed. When optional set-on demodulators 34 are used, optical multichannel correlator 30 is used to cue set-on demodulators 34 to demodulate signal 32 S(t) with the set of most likely codes and time offsets. In this optional configuration, the output of demodulators 34, demodulator-generated correlation matrix 36, is provided to receiver algorithms 38 in place of optical correlator output 22. Set-on demodulators 34 are a small subset of all possible codes and time offsets and are implemented in conventional digital or analog technology. The advantage of this operation is reduction of possible noise imparted by optical multichannel correlator 30.

The architecture of multichannel optical correlator 30 may be varied depending on the exact receiver function to be performed with respect to signal 10, as well as the receiver algorithm(s) 38 to be used. Moreover, the optical correlator may be operated in a different way depending on how the hypotheses are generated. The presence of a controller to generate the hypotheses allows flexibility in operation of a given optical correlator.

In general, however, multichannel optical correlator 30 will be configured as a bank of one-dimensional (1-D) optical correlators generating a two-dimensional correlation matrix as the output. As will be further described below with reference to the specific embodiments, a variety of configurations, or architectures, is possible within this general framework. The precise architecture will be selected according to the needs of the communications application. Consideration will be given to receiver algorithms 38 to be applied, as well as to practical constrains of size and economy. Several broad categories of architectures are illustrated below and in the Figures. Variations and modifications are suggested, and those skilled in the art will consider other modifications and adaptations as well, depending on the needs of the particular multiuser communications system.

Other configurations or architectures will also be within the scope in accordance with the present invention as described and suggested herein.

For example, FIG. 4 depicts an expanded view of multichannel optical correlator 30 of FIG. 3, in an example illustrating a specific configuration for performing complex correlation at baseband. Real part 40 and imaginary part 42 of the converted baseband signal 32 from RF conversion means 14 should be correlated separately and combined to produce the complex correlation value. Real part 40 is processed in optical correlator banks 48, utilizing the real part 44 of the hypothesis matrix. Similarly, imaginary part 42 is processed in optical correlator banks 48, utilizing the imaginary part 46 of the hypothesis matrix. The output from each optical correlator bank 48 is sent to analog-to-digital converters 50. Finally, the real parts are combined via subtractor 54 to generate real part 56 of correlation matrix 22. The imaginary parts are combined via adder 52 to generate imaginary part 58 of correlation matrix 22.

FIG. 5 depicts an alternative expanded view of multichannel optical correlator 30 of FIG. 3, in an example illustrating a specific configuration for performing complex correlation at an Intermediate Frequency (IF). Here, output 62 (corresponding to converted signal 32 of FIG. 3) is at IF $\omega_{IF}$. Following processing in optical correlator bank 38, output 64 is provided to Quadrature RF-to-Baseband Converter 68, comprising RF mixers 66, local oscillator 70, phase shift 72 and low pass filters 74. Conversion via analog-to-digital converters 50 generates real part 56 of correlation matrix 22 and imaginary part 58 of correlation matrix 22, respectively.

Examination of Equation (1) reveals that to perform correlations, mechanisms must exist for multiplying the received waveform and all samples of the hypothesis waveforms, integrating over some time interval, and producing time offsets between the received waveform and hypothesis. The exemplary embodiments of the optical correlation processor describe different means to implement these mechanisms. Those skilled in optical processing will appreciate that there are many modifications and variations of the basic architectures described in the preferred embodiments, each of which can be employed in the method and apparatus in accordance with the present invention.

In a first application in accordance with the present invention, optical correlation processors are combined with any of a variety of MUD algorithms to achieve near-optimum detection of each separate individual transmitter (user) for removal of MAI. If knowledge of all users is properly incorporated into the detection process, then a fully loaded spread spectrum communications system can approach the performance of the same system with only a single user present. Thus, if the final detection can take advantage of more complete information about the signal environment, the detection process can be improved. This permits either greater capacity or higher quality in the resulting communications system.

A multichannel optical correlation processor simultaneously correlating the received signal with a set of hypothesized waveforms encompassing all probable or known signature waveforms may be used according to the present invention to rapidly provide the desired information to achieve this goal. Furthermore, the correlation may be performed over a set of all time offsets between the received and hypothesized waveform encompassing all possible time offsets of interest as defined by the communications system architecture. The output of the optical correlator is a set of data for each hypothesized waveform, with each datum being the estimate of the complex-valued sum of the correlation between the hypothesized signal and each of the signals present in the received signal, with one datum for each possible time offset.

In a second application in accordance with the present invention, multichannel optical correlation processors are combined with RF multipath combining algorithms to improve performance where such multipath exists. The optical correlator processor simultaneously correlates the received signal with a set of hypothesized waveforms encompassing all possible time delays to provide measurements of the multipath of a particular received signal. Multipath replicas of the transmitted waveform can be characterized as a time-delayed version of the direct path signal. Correlations are produced at time offsets different from the main path signal, equal to the difference in travel time along the various multipath routes. The presence of multiple correlation data with sufficient magnitude to be detectable indicates the presence of multipath in the received signal. Furthermore, the time offset at which the correlations occur, as well as the RF phase of the correlation, as indicated by its complex value provide estimates of the time delay and RF phase offset of each separate received multipath signal. This data is provided to a multipath combining algorithm, such as a RAKE receiver, to remove the multipath effects and provide an increase in received signal quality.

In a third application in accordance with the present invention, optical correlation processors are used to provide estimates of any existing Doppler shifting of the received RF signal. The optical correlation processor simultaneously correlates the received signal with a set of hypothesized waveforms encompassing all probable or known signature waveforms and probable RF frequency offsets resultant from Doppler shifting of the RF signal. The specific Doppler shift of a particular received waveform is identified as the hypothesis that results in the correlation datum with the highest valued magnitude for the set of hypothesis associated with that particular waveform. The data is provided to a Doppler shift compensation algorithm to adjust for the presence of Doppler shifting and provide an increase in received signal quality.

It will be appreciated that the optical processors described herein can be used in other applications as well, in accordance with the present invention, by selecting an appropriate receiver algorithm(s) for the correlation problem to be solved, and selecting an appropriate optical processor architecture to generate the appropriate correlations.

First Preferred Architecture

Detector Integrating, Detector Displacement Architecture (DIDD)

A first exemplary embodiment of a multichannel optical correlation means in accordance with the present invention makes use of a unique characteristic of a certain class of photosensors known as Time Delay and Integrate (TDI) sensors disclosed by Bromley et al. (U.S. Pat. No. 3,937, 942). TDI sensors are derived from a broader class of electronic devices known as Charge-Coupled Devices (CCDs). A CCD comprises a row of electronic charge holding regions known as wells. A clocking signal causes the charge, comprising electrons, to sequentially move from one well to the next adjoining well. The output of the CCD is an electrical signal created by sensing the amount of charge held in the last well of the CCD row. After sensing, the charge in the last well is discarded.

TDI sensors are created from CCDs by allowing each well to be a photo-active sensing region that accumulates an electronic charge proportional to the intensity of light impinging on it, and adds that accumulated charge to any existing charge in the well. Thus, the output of the TDI sensor is the sensed charge contained within the last well, comprising the charge accumulated at each well along the CCD row. This characteristic of accumulating charge as it is shifted along the CCD row is used in this first preferred embodiment to provide both the means for integration and the means for producing time shifts of the received signal against each hypothesis.

FIG. 6 illustrates an example of the basic optical correlation processor architecture of this first preferred embodiment, referred to as a Detector Integrating, Detector Displacement (DIDD) architecture. The DIDD architecture depicted in FIG. 6 could be used as multichannel optical correlator 30 in the system depicted in FIG. 3. The simple configuration of this embodiment allows the multichannel optical correlator to be manufactured in a small package and at low cost. This would be suitable, for example, for inclusion in a mobile handset receiver for use in a telecommunications system.

The DIDD architecture of FIG. 6 comprises modulated light source 76, mask 80 containing the set of hypothesis elements or values 82, and TDI sensor 86 comprising a plurality of TDI sensing rows 88. Modulated light source 76 generates a broad light beam 78 which is intensity-modulated by the signal amplitude of signal 32. With reference to the block diagram of FIG. 3, light beam 78 is intensity-modulated by the output of signal conversion means 14. Modulated light source 76 may be a source suitable for generating coherent light, such as a semiconductor laser diode, or may be suitable for generating incoherent light such as a light-emitting diode (LED).

Mask 80 may be any two-dimensional spatial light modulator that causes light impinging in any particular area of the device to be multiplied by either the transmissivity or reflectivity of that particular area of the device. The transmissivity or reflectivity of the area is equivalent to the value of the hypothesis stored at that particular area. Exemplary masks include fixed masks such as metal on glass, or programmable masks such as liquid crystal modulators, magneto-optical modulators, or micro-mechanical mirror devices. Light exiting mask 80 is a spatially distributed plurality of beams.

Light exiting light source 76, having a time-varying intensity of S(t), is made incident on the entire array of hypothesis elements $H_m(t_n)$ 82 stored in mask 80. Light exiting mask 80 comprises an M' row×N' column array of beams with an intensity of S(t) $H_m(t_n)$. Each beam is individually made incident on a corresponding TDI sensor 88 comprising M' rows of N' wells $D_{m,n}$. Each well accumulates charge proportional to the intensity of the impinging light for the time interval τ equal to the period of the TDI clock and adds the charge to any existing charge in that well.

After Δτ integration period, the charge is shifted to the next well Dm, n+1, where the operation is repeated. The well $D_{m,n}$ then accumulates the charge resulting from the multiplication of the hypothesis $H_m(t_n)$ with S(t) delay by Δτ seconds relative to the previous accumulation.

In general, the value in any well n>0, at any clock epoch time T, is the value of the integration for the last integration period Δτ plus the sum of all previous n−1 integrations, for an arbitrary time delay of τ, as shown in Equation (7):

$$D_{m,n}(T) = \int_{T-\Delta t}^{T} S(t-\tau)H_m(t_n)\,dt + \sum_{n=1}^{n-1}\left[\int_{T-(n+1)\Delta t}^{T-n\Delta t} S(t-\tau)H_m(t_n)\,dt\right] \quad (7)$$

The quantity τ in (7) is further defined to be $$\tau = \tau_0 + K\Delta t \quad (8)$$

where K is the number of clock cycles of Δt duration that have occurred since the time offset was some initial value of $\tau_0$.

From Equation (7), it is readily apparent that the contents of the last well, $D_{m,N'}$, is given by:

$$D_{m,N'}(T,\tau) = \sum_{n=0}^{N'-1}\left[\int_{T-(n+1)\Delta t}^{T-n\Delta t} S(t-\tau)H_m(t_n)\,dt\right] \quad (9)$$

Since the array of hypothesis elements $H_m(t_n)$ are representative of a hypothesis time series $H_m(t)$, the result may be written as:

$$D_{m,N'}(T,\tau) = \int_{T-N'\Delta t}^{T} S(t-\tau)H_m(t)\,dt \quad (10)$$

Equation (10) is the correlation between the received waveform S(t) and the $m^{th}$ row of hypothesis mask 80 at any time T with a time offset of τ seconds integrated over the duration of N Δτ seconds. Furthermore, from Equation (8), for each successive time T+Δτ, the time delay τ increases by Δτ, therefore the time series output of $D_{m,N}$ is correlation of successive time delays of the received waveform relative to the hypothesis $H_m$.

In general, the real and imaginary parts of the baseband signal from the RF conversion means should be correlated separately and electrically combined, as illustrated in FIG. 4.

Moreover, since the light is intensity modulated and intensity detected and intensity is always positive values, the output as given in Equation (9) is on a bias equal to the average value over the integration period. This bias should be removed to obtained correct correlation values. Removal of the bias can be performed electronically by subtracting an estimated average value. A more robust method is to correlate the received waveform with both the hypothesis and the negative of the hypothesis and subtract the results providing an absolute bias removal.

A system composed of M' rows of hypotheses in mask 80 and M' rows of TDI detectors 88 sampled at N' instances in time corresponding to N' time offsets $\tau_n$, with means for real/imaginary processing and bias removal, calculates correlation matrix $C_{m,n}(H_m,\tau_n)$ of Equation (3) for the received waveform S(t) of Equation (6) needed for receiver algorithm(s) 38 in accordance with the present invention. Again, with reference to FIG. 3, correlation output 90 from TDI sensing rows 88 would be directed to one or more receiver algorithms 38.

FIG. 7 illustrates an example of a very compact stacked structure which can be achieved in devices embodying the general architecture of FIG. 6. Diffuse light source 92 comprises modulated light source 76 (depicted in FIG. 6) and optics (not shown) appropriate to spread the light evenly over the device. The Spatial Light Modulator component comprises hypothesis mask 80 (depicted in FIG. 6). The Charge Coupled Device (CCD) may employ TDI sensor 80 (depicted in FIG. 6).

FIG. 8 is a mathematical representation of the correlation operation illustrated in FIG. 6. Illustrated is the accumulation of correlation output 22 in successive stages of TDI sensing rows 88 as time progresses.

Second Preferred Architecture

Detector Integrating, Detector Displacement Architecture with Integrated Mask (DIDD-IM)

A second exemplary embodiment of an optical correlation means in accordance with the present invention is a variation of the DIDD architecture depicted generally in FIG. 6 and described above. This Second preferred Architecture simplifies the DIDD architecture by integrating the hypothesis mask with the TDI sensor. While operating in generally the same manner, the DIDD-IM architecture eliminates the need for a physically separate mask. As shown in FIG. 9, modulated light source 76 directly illuminates integration sites 88 of integrated hypothesis and TDI sensor 106.

This Second preferred Architecture may be constructed either using an analog mask register or a binary mask register. FIG. 10 illustrates an example of use of an analog mask register as hypothesis register 95. In this embodiment, each row of TDI sensor 86 is fabricated with separate detector elements 94, a separate analog summation register 100, and additional analog CCD shift register 95 containing time sequential hypothesis values 82. Analog multiplier means 96 is also provided to multiply hypothesis value 82 of the $m^{th}$ entry in hypothesis register 95 times the accumulated charge value of $m^{th}$ integration site 94. Adder 98 sums that result with the value contained in the mth-1 stage of accumulating register 100 and places the summed result into the $m^{th}$ stage of accumulating register 100.

FIG. 11 illustrates an example of a derivative embodiment of the DIDD-IM architecture applicable when the hypothesis is composed of binary values. In this embodiment, a binary register is used as hypothesis register 95. Analog multiplier means 96 of FIG. 10 is replaced with switching means 102. If $m^{th}$ hypothesis register value 82 is equal to "1", switching means 102 allows the accumulated charge of $m^{th}$ detector element 94 to be summed with the mth-1 stage of analog summation register 100. If $m^{th}$ hypothesis register value 82 is equal to "0", switching means 102 allows the accumulated charge of the $m^{th}$ detector element 94 to be discarded.

Third Preferred Architecture

Space Integrating Traveling Wave Displacement Architecture (SITWD)

A third exemplary embodiment of a multichannel optical correlation means in accordance with the present invention, shown in FIG. 12, utilizes Space Integrating Traveling Wave Displacement (SITWD) architecture. The SITWD architecture depicted in FIG. 12 could be utilized as multichannel optical correlator 30 of the system depicted in FIG. 3. This architecture performs the integration function by collecting all light beams physically distributed in space and focusing them onto a single photodetector element where they produce an output signal proportional to the sum of their intensities. Examples of this class of optical correlation architecture can be seen in U.S. Pat. No. 4,833,637 (Casasent et al.). As shown in FIG. 12, this embodiment utilizes a traveling acoustic wave propagated along the x axis to produce the distribution in space of received waveform or signal 32, with the means to produce time shifts between signal 32 and hypotheses 82.

The traveling acoustic wave is produced in acousto-optic modulator device 110, known as a Bragg cell. A Bragg cell comprises an optically-clear crystal with a piezo-electric transducer bonded to one end. An electrical signal applied to the transducer causes it to expand and contract proportional to the energy in applied signal 32 This expansion and contraction launches an acoustic wave in the crystal with an instantaneous amplitude and phase proportional to the amplitude and phase of applied signal 32 The acoustic wave travels at a velocity v through the crystal along axis x until it reaches the end where it is absorbed such that it does not reflect back into the crystal. Thus, at any point x along the crystal axis x of propagation, the acoustic wave g(x) represents the input signal as given by:

$$g(x) = S\left(t - \frac{x}{v}\right) \quad (11)$$

Since x/v represents a quantity of time, Equation (11) may also be written as:

$$g(x) = S(t - \tau_x) \quad (12)$$

The acoustic wave g(x) at any point x in Bragg cell 110, at any time t, is equal to the input signal 10 delayed in time proportional to the distance x from the transducer. Spatially distributed light generated by constant intensity light source 108 passes through the crystal of Bragg cell 110. The light interacts with the acoustic wave such that light exiting the crystal (light beam 78) has been multiplied by the value of the acoustic wave at each point the light impinges on Bragg cell 110.

In the SITWD architecture of FIG. 12, light source 108 of constant intensity A is made to evenly illuminate a length X' of Bragg cell 110, illustrated as light beam 78. The received waveform or signal 32 is applied to transducer 113 of Bragg cell 110. A plurality of light beams 114 exits Bragg cell 110, each beam 114 having been multiplied by the representation of signal 32 (S(t)) present at the location x where that particular beam 114 passed through Bragg cell 110.

The plurality of beams 114 exiting Bragg cell 110 are made to illuminate hypothesis mask 80 such that each separate beam 114 illuminates a column of constant time delay of hypothesis mask 80. Hypothesis mask 80 may be any two-dimensional spatial light modulator, such as described in the First Preferred Architecture, above. Each beam 114 illuminating hypothesis mask 80 is multiplied by the value of hypothesis element or value 82 represented in hypothesis mask 80 at the point at which such illuminating beam 114 strikes mask 80. The plurality of beams 115 exiting from hypothesis mask 80 are made to illuminate an array of photo diode point detectors 112 such that all beams 115 exiting from the areas of hypothesis mask 80 associated with $m^{th}$ hypothesis row 82 illuminate $m^{th}$ photo diode point detector 117. Plurality of beams 115 striking $m^{th}$ photo diode point detector 117 causes detector 117 to produce an instantaneous electrical signal with either a voltage or current proportional to the sum of the intensities of the plurality of beams 115 instantaneously striking such detector 117. The electrical signal produced by $m^{th}$ detector 117 is the measure of the correlation between received signal 32 and $m^{th}$ hypothesis 82. Correlation output 90 is thus generated, producing correlation matrix 22. With reference again to FIG. 3, correlation matrix 22 would be provided either to optional set-on demodulators 34 or to receiver algorithms 38.

FIG. 13 illustrates an example of one channel of the architecture shown in FIG. 12.

The operation of the SITWD architecture may be mathematically described as follows.

The light spatially distributed in axis x exiting Bragg cell 110 as plurality of light beams 114 is g(x):

$$g(x) = S\left(t - \frac{x}{v}\right) \quad (11)$$

Defining the modulation function of the mask in terms of x gives:

$$H_m(x) = H_m(t_n) \quad (13)$$

The light spatially distributed in x and m exiting the mask is $f_m(x)$:

$$f_m(x) = g(x)H_m(x) \quad (14)$$

Focusing light beams 115 to any photodetector $D_m$ 117 is equivalent to integration along the spatial direction x with the output of photodetector 117 being $C_m(t)$:

$$C_m(t) = \int_0^{X'} f_m(x)\,dx \quad (15)$$

Substituting Equation (14) and Equation (11) into Equation (15) gives a time-varying correlation function in terms of a spatial integration where X' is the physical length of the Bragg cell aperture:

$$C_m(t) = \int_0^{X'} S\left(t - \frac{x}{v}\right)H_m(x)\,dx \quad (16)$$

For each instance in time, the value of the correlation function, $C_m(t)$ is the value of the correlation at a different time offset between the moving g(x) acoustic wave and the fixed position mask $H_m(x)$ (that is, any hypothesis element or value 82).

As indicated above, the real and imaginary parts of a baseband signal from any RF signal conversion means 14 should be correlated separately and appropriately combined. Furthermore, since the light is intensity modulated and intensity detected and intensity is a positive value, the output as given in Equation (16) is on a bias equal to the average value over the integration period. This bias should be removed to obtained correct correlation values. Removal of the bias can be performed electronically by subtracting an estimated average value. A more robust method is to correlate the received waveform with both the hypothesis and the negative of the hypothesis and subtract the results providing an absolute bias removal.

The embodiment described comprises M' hypotheses and M' photosensors sampled at N' instances in time corresponding to N' time offsets $\tau_n$, with means for bias removal and real/imaginary processing. Referring back to FIG. 3, this embodiment calculates correlation matrix 22 (that is, $C_{m,n}$ ($H_m,\tau_n$) of Equation (3)) for received signal 10 (that is, waveform S(t) of Equation (6)). Correlation matrix 22 may then be provided either to optional set-on demodulators 34 or to receiver algorithms 38.

Fourth Preferred Architecture

SITWD Architecture with Reference Beam for Coherent Detection

A fourth exemplary embodiment of a multichannel optical correlation means in accordance with the present invention is shown in FIG. 14. This embodiment is derived from the Space Integrating Traveling Wave Displacement (SITWD) architecture of FIG. 12, with the inclusion of reference beam 120. In addition, FIG. 14 details the optics (beam-forming lenses 124, imaging lenses 125 and integration lenses 126) that may be used in implementing some embodiments in accordance with the present invention. Persons of ordinary skill in the art will appreciate that similar optics could naturally be included in the embodiments depicted in FIGS. 9, 12, 13, and 15 through 18; they have been omitted from those figures for clarity in depicting several of the major components of the suggested architectures.

In FIG. 14, beam splitter/combiner 119 creates unmodulated reference beam 120 which, by means of mirrors 122 and second beam splitter/combiner 119, is made coincident on photodiode array 112 along with main beam 118 after beam 118 has been processed as indicated in the figure.

This architecture makes use of the additional fact that the light exiting Bragg cell 110 is also shifted in frequency by an amount equal to the IF frequency. The presence of reference beam 120 allows main beam 118 to be coherently detected through heterodyne multiplication of reference beam 120 and main beam 118. Because main beam 118 has been shifted in frequency by the IF frequency, and reference beam 120 has not, the multiplication of the two beams results in a signal at the difference frequency of the two beams. This produces, at the output of photodetector array 112, an IF signal with a complex modulation equal to correlation values 90. This output 90 then could be converted to baseband complex (real and imaginary) values by a quadrature RF to baseband down converter such as shown in FIG. 5 as element 68. Converter 68 outputs only the complex modulation values equal to the correlation values.

Fifth Preferred Architecture

Detector Integrating Traveling Wave Displacement Architecture (DITWD)

A fifth exemplary embodiment of the multichannel optical correlation means in accordance with the present invention, shown in FIG. 15, is an example of Detector Integrating Traveling Wave Displacement (DITWD) architecture. Examples of this general architecture can be seen in U.S. Pat. No. 4,225,938 (Turpin). This class of architectures performs the integration function through time integration over the time interval T at detector sites 128, which may be a CCD or other 2-D time integrating detector means. The time offsets, nτ, are produced by a traveling acoustic wave along axis x in Bragg cell 110 in the same manner as in the SITWD embodiment (Third Preferred Embodiment), above.

In the DITWD architecture of FIG. 15, a plurality of intensity modulated light beams 78 is made incident across the physical aperture of Bragg cell 110. Modulated beams 78 may be created by direct modulation of each of a plurality of light sources (the array of modulated light sources shown as element 127 by the time series of the respective hypothesis $H_{1,m}(t)$. Each light source may be an incoherent source such as an LED or a coherent source such as a laser diode. The light sources may or may not be mutually coherent. Alternatively, the plurality of beams 78 may be created from a single constant intensity incoherent or coherent light source and a plurality of intensity modulators such as acousto-optic or electro-optic modulators, each modulating a beam with one of the set of hypothesis time series.

Independent of the means by which the plurality of intensity modulated beams 78 is created, each beam 78 is made incident across the aperture of Bragg cell 110, which contains the acoustic wave representation of the received signal 32 as in Equation (10). The plurality of beams 114 exiting Bragg cell 110, having been multiplied by the representation of S(t), is made incident on detector sites 128, which may be a CCD or other 2-D time integrating detector means. Beams 114 are made incident on detector sites 128 such that the $m^{th}$ beam 114 corresponding to the $m^{th}$ hypothesis illuminates all N photosensors of the $m^{th}$ set of photosensors (that is, photosensor row 88). Furthermore, each $m^{th}$ beam 114 is made incident on the $m^{th}$ set of photosensors such that each nτ time interval of the representation of S(t) in Bragg cell 110 is made incident on the $n^{th}$ photosensor within the set.

After the integration time T, the accumulated values in the photosensors are sensed and converted to either a voltage or current electrical signal representing the $n^{th}$ time offset of the $m^{th}$ hypothesis correlation value $C_m(n)$. The sensed signals are output sequentially for each $m^{th}$ hypothesis creating a plurality of time outputs $C_{1...N}(n\tau)$ corresponding to the value of the correlation of the $m^{th}$ hypothesis at the $n^{th}$ time delay nτ. These are represented in FIG. 15 as correlation matrix 22, comprising correlation values 90.

The operation of the DITWD architecture may be mathematically described as follows.

Let the $m^{th}$ modulated beam be $H_m(t)$. The light exiting the Bragg cell, $f_m(t)$ is then:

$$f_m(t) = S\left(t - \frac{x}{v}\right) H_m(t) \quad (17)$$

Allowing the time quantity x/v to be the $n^{th}$ time delay nτ, Equation (16) becomes:

$$f_m(t) = S(t - n\tau) H_m(t) \quad (18)$$

Integration of Equation (18) on photosensor $D_{m,n}$ for the time interval T computes the correlation $C_{m,n}$ as defined in Equation (3):

$$C_{m',n} = \int_0^T S(t - n\tau) H_m(t) dt \quad (19)$$

As indicated above, the real and imaginary parts of a baseband signal from any RF signal conversion means 14 should be correlated separately and appropriately combined to produce the complex correlation value. Furthermore, since the light is intensity modulated and intensity detected and intensity is always positive values, the output as given in Equation (19) is on a bias equal to the average value over the integration period. This bias should be removed to obtained correct correlation values. Removal of the bias can be performed electronically by subtracting an estimated average value. A more robust method is to correlate the received waveform with both the hypothesis and the negative of the hypothesis and subtract the results providing an absolute bias removal.

The embodiment described comprises M' hypotheses and M'×N' photosensors corresponding to N' time offsets $\tau_n$, with means for bias removal and real/imaginary processing. Referring back to FIG. 3, this embodiment calculates correlation matrix 22 (that is, $C_{m,n}(H_m, \tau_n)$ of Equation (3)) for received signal 10 (that is, waveform S(t) of Equation (6)). Correlation matrix 22 is then provided either to optional set-on demodulators 34 or to receiver algorithms 38.

Sixth Preferred Architecture

Time Integrating Parallel Load (TIPL)

FIGS. 16–19 illustrate various embodiments of time-integrating architectures A sixth exemplary embodiment of the multichannel optical correlation means in accordance with the present invention utilizes time integration. Several embodiments of this general category of architecture are illustrated in FIGS. 17–19. This category may be envisioned as derived from the DITWD architecture.

FIG. 16 is provided for facilitating an understanding of FIGS. 17 and 18. For illustration in FIG. 16, the array of modulators 127 of FIG. 15 (the DITWD architecture described as the Fifth Preferred Architecture) is replaced with single point modulator 130.

In FIGS. 17–18, a first array of modulators 132 is used. Again with reference to FIG. 15 (DITWD architecture), the acoustic wave representation contained in Bragg cell 110 is replaced in FIGS. 16–19 with a second array or plurality of intensity modulators (or point modulators) 132. Modulators 132 may be acousto-optic or electro-optic modulators, each modulating a plurality of light beams 78 or 115. In a first configuration, each of the first array of modulators 132 modulates a first plurality of modulated beams 78 with received signal 32. These values would be continuously varying in response to time-varying received signal 32. This set of values may be, for example, time-delayed versions of received signal 10 to produce the necessary time offset, t∂. Alternatively, this set of values may be received signal 10 multiplied by a Doppler hypothesis, or combinations thereof. Other versions of the received signal may also be used to implement other desirable correlations. In the TIPL embodiment, the time-delays need not be contiguous as they are in the DITWD architecture. Instead, they may be independently determined through signal conversion means 14 (shown, for example, in FIG. 3). The versions of received signal 32 applied to one set of modulators 132 need not be different in time delay. For instance, they could instead be different in frequency, or they could be different in both time and frequency. These may be created by signal conversion means 14 creating a plurality of inputs to multichannel optical correlator 30 of FIG. 3.

With reference to FIGS. 17 and 18, each of the beams from the first plurality of modulated beams 78 is multiplied by the value 82 applied to the second plurality of modulators 132, creating a second plurality of modulated beams 115. Where the first plurality of beams 78 is a one-dimensional array, or vector, of beams, the second plurality of beams 115 is a two-dimensional array of beams, comprised of all beams of the first plurality 78 multiplied by all values 82 of the second plurality of modulators 132.

The second plurality of beams 115 is made incident on a second two-dimensional time-integrating array 128 of photosensors. In this first configuration being described, each of the second array of modulators 132 modulates a second plurality of modulated beams 115 with one value from a set of hypothesis values 82. Here, a single beam from the first plurality of beams 78, having been further modulated by one of the second plurality of modulators 132, illuminates a single photosensor in the array 128. In general, a modulated beam from such second plurality of beams 115 will illuminate a row (or column) of the two-dimensional photosensor array 128. The set of modulated beams 115 resulting from one beam from the first plurality 78 multiplied by the values 82 contained in all modulators of the second plurality of modulators 132 illuminates a column (or row) of the photosensor.

It will be appreciated that a second configuration may easily be employed. Here, the first array of modulators 132 would provide hypothesis values 82, while the second array of modulators 132 would provide signal 32.

FIG. 19 is a conceptual illustration of a compact module stack embodying the architecture of FIG. 18.

Additional Technical Information

DS/SS CDMA—In DS/SS CDMA systems, information (i.e., data, voice, Internet, video) is multiplied by a spreading code to transmit the information over a wider bandwidth than is required by the bandwidth of the information. Unique digital codes (for example, pseudo-random (PN) code sequences) are assigned to transmitted signals to differentiate them from each other, since users transmit using the same frequency band simultaneously. The receiver distinguishes the individual transmitted signals by multiplication of the signal with the known spreading code. This correlation function despreads the wideband signal back to the narrower natural bandwidth of the data.

A category of DS/SS CDMA is known as Ultra Wideband (UWB). Here, the digital code produces pulses that are very short, on the order of one cycle of RF (1 nanosecond at 1 GHz.) with the coding based on the positions (time between) of a set of these short pulses. The coding changes the position. This is the same as having a code, generated at a very high chip rate, with a small percentage of "on" values. The basic correlation operation is the same. Examples of UWB are shown in U.S. Pat. No. 5,610,907 (Barrett) and U.S. Pat. No. 4,979,186 (Fullerton).

Complex Receiver Algorithms—The signals generated by multiple simultaneous users in a communications systems represent noise with respect to each other. This is referred to as Multiple Access Interference or MAI. An ideal MUD algorithm would completely remove all MAI, leaving the desired signal with a noise level of thermal noise and achieving the maximum despread SNR independent of the number of users present. This ideal algorithm, as taught by S. Verdu, "Multiuser Detection", Chapter 4, pp 154–233, Cambridge University Press, 1998, is known as Optimum CDMA (OCDMA). In a system employing OCDMA, the bandwidth efficiency of the system may be maximized to the theoretical limit of information capacity. However, OCDMA is considered to be an impossibly complex algorithm to implement for any reasonably large number of users: there is no practical way to generate the vast amount of data required to feed the OCDMA algorithm, and there is no practical way to perform the operations prescribed by the OCDMA algorithm on that data.

Other, less complex, MUD algorithms have been developed. Although these MUD algorithms also require vast data input, they are designed only to approximate the OCDMA algorithm, and would therefore remove only a portion of the actual MAI. U.S. Pat. No. 5,343,496 (Honig) and U.S. Pat. No. 6,014,373 (Shilling et al.) offer proposed MUD algorithms that could potentially be used. Nevertheless, no mechanism has been developed or suggested to actually implement any MUD algorithms in a multiuser communications system, and such communications systems typically still rely on the less efficient SUD methods.

As discussed above, MUD algorithms have largely been a matter of mathematical interest until now. There has been no practical system or method of implementing them in a CDMA communications system, since no practical mechanism had been developed for providing the vast number of simultaneous calculations necessary.

Consider, for example, that the metric for measuring computational performance is the number of multiply-accumulates (in millions) per second (MMACs). This measure is a commonly used term in sizing Digital Signal processors (chips) or DSPs. Current and proposed high-end DSP devices optimized for correlation processing are rated in the 2400 to 4800 MMACs range, although the actual achievable rate will be considerably lower, perhaps less than half.

For use in joint-detection algorithms such as MUD, a two-dimensional matrix of correlation values is required. For simplicity, consider that if $f_1$ is a hypothesis and $f_2$ the received signal to be measured, each $f_1$ and each time offset of each $f_1$ is a different hypothesis requiring a separate calculation of the correlation function. The rows of the correlation matrix will be the time offsets of a particular $f_1$ hypothesis and the columns will be different $f_1$ hypotheses. In a CDMA system, $f_1$ (columns) represent the different users and the time offsets (rows) represent the multipath signals.

The number of MMACs required to calculate the matrix of correlation values is determined by the number of entries in the matrix, i.e., #users×#time offsets×the rate at which each is sampled, $1/\Delta T$. This sample rate should be at least as high as the bandwidth of the signal and preferably 2–4 times higher. For each sample, 4 MACs are required to perform the required multiplication of two complex numbers. As an example, IS-95 (CDMAone), the current standard for cellular CDMA, uses a bandwidth of 1.25 MHZ with a theoretical maximum of 64 users and 128 possible chip delays per cell sector. Therefore, to fully populate the correlation matrix for one sector requires:

$$MMACs = \# \text{ users} * \# \text{ delays} * \text{oversampling} * \text{bandwidth (MHz)} * MACs \text{ per sample}$$
$$= 64 * 128 * 2 * 1.25 * 4$$
$$= 81{,}920.$$

This would require approximately 20–40 of the current best DSP chips.

Future systems (3G and beyond) are expected to increase bandwidth (3×), number of users (8×), and number of time offsets (8×), increasing the computational requirements by up to a factor of 192, thus requiring as much as $1.5 \times 10^6$ MMACs. Adding in the desire to process user information from adjacent sectors drives the processing requirement up by another order of magnitude. A much more powerful technology than DSP processing clearly will be required to achieve the ultimate level of performance and maximize bandwidth usage.

While the description herein refers to particular embodiments in accordance with the present invention, it will be understood that many modifications may be made without departing from the spirit thereof. The accompanying claims are intended to cover such modifications as would fall within the true scope and spirit in accordance with the present invention.

The presently disclosed embodiments are therefore to be considered in all respects as illustrative and not restrictive, the scope in accordance with the present invention being indicated by the appended claims, rather than the foregoing description, and all changes which come within the meaning and range of equivalency of the claims are therefore intended to be embraced therein.

What is claimed is:

1. A multiple user communications system, comprising:
   at least one receiver for receiving a plurality of signals,
   at least one optical processor for optically correlating at least one of the plurality of received signals simultaneously against a plurality of hypothesized signals to generate data comprising a plurality of correlations, the optical processor comprising at least a one-dimensional optical correlator configured to produce an output comprising a multi-dimensional output array having a first dimension and a second dimension, the first dimension associated with a correlation of an input with different hypotheses and the second dimension associated with sliding correlation results at sub-intervals of a correlation interval,
   at least one receiver algorithm for applying to the data generated by the optical processor for at least one of identifying, sorting and separating the plurality of received signals based upon the generated plurality of correlations,
   whereby interference among the plurality of received signals is reduced.

2. The system of claim 1, comprising a controller for providing the plurality of hypothesized signals to the optical processor.

3. The system of claim 1, wherein the optical processor comprises a plurality of one-dimensional optical correlators for generating an output comprising a two-dimensional correlation matrix.

4. The system of claim 1, comprising a converter for converting the plurality of received signals into a form suitable for input to the optical processor.

5. The system of claim 1, wherein the receiver algorithm comprises a complex signal-to-noise enhancement algorithm.

6. The system of claim 5, wherein the receiver algorithm performs at least one of multiuser detection, multipath combining and Doppler compensation.

7. The system of claim 1, wherein the receiver algorithm comprises a complex multiuser receiver algorithm.

8. The system of claim 1 wherein the multiple user communications system comprises a direct sequence spread spectrum CDMA communications system and wherein the receiver algorithm comprises a Multiple User Detection (MUD) algorithm.

9. A method of reducing interference in a multiple user communications system, comprising:
   receiving a plurality of signals,
   optically correlating at least one of the plurality or received signals simultaneously against a plurality of hypothesized signals to generate data comprising a plurality of correlations,
   the step of optically correlating comprising configuring at least a one-dimensional optical correlator to produce an output comprising a multi-dimensional output array having a first dimension and a second dimension, the first dimension associated with a hypothesis and the second dimension associated with a correlation result,
   applying at least one receiver algorithm to the data for at least one of identifying, sorting and separating the plurality of received signals based upon the generated plurality of correlations,
   whereby interference among the plurality of received signals is reduced.

10. The method of claim 9, wherein the receiver algorithm comprises a complex signal-to-noise enhancement algorithm.

11. The method of claim 10, wherein the receiver algorithm performs at least one of multiuser detection, multipath combining and Doppler compensation.

12. The method of claim 9, wherein the receiver algorithm comprises a complex multiuser receiver algorithm.

13. The method of claim 9 wherein the multiple user communications system comprises a direct sequence spread spectrum CDMA communications system and wherein the receiver algorithm comprises a Multiple User Detection (MUD) algorithm.

* * * * *